US011706656B2

(12) United States Patent
Chilla et al.

(10) Patent No.: US 11,706,656 B2
(45) Date of Patent: Jul. 18, 2023

(54) DOWNLINK DATA PRIORITIZATION FOR TIME-SENSITIVE APPLICATIONS

(71) Applicant: QUALCOMM Incorporated, San Diego, CA (US)

(72) Inventors: Rajashekar Chilla, San Diego, CA (US); Lakshmi Bhavani Garimella Srivenkata, San Diego, CA (US); Krishna Billuri, San Diego, CA (US); Sri Sai Kandakatla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 16/915,145

(22) Filed: Jun. 29, 2020

(65) Prior Publication Data
US 2021/0409999 A1    Dec. 30, 2021

(51) Int. Cl.
*H04W 28/02* (2009.01)
*G06F 13/38* (2006.01)
(Continued)

(52) U.S. Cl.
CPC ...... *H04W 28/0268* (2013.01); *G06F 13/382* (2013.01); *H04L 12/4679* (2013.01);
(Continued)

(58) Field of Classification Search
CPC ........... G06F 13/382; G06F 2213/0026; G06F 2213/0042; H04W 28/0268;
(Continued)

(56) References Cited

U.S. PATENT DOCUMENTS 9,927,959 B2 * 3/2018 Wigdor ................ G06F 3/0484
9,940,284 B1 * 4/2018 Davis .................. G06F 13/4221
(Continued)

FOREIGN PATENT DOCUMENTS

WO    2020068430 A1    4/2020
WO    2020131932 A2    6/2020

OTHER PUBLICATIONS

International Search Report and Written Opinion—PCT/US2021/032385—ISA/EPO—dated Sep. 14, 2021 15 pages.

*Primary Examiner* — Chirag G Shah
*Assistant Examiner* — Joshua Smith
(74) *Attorney, Agent, or Firm* — The Marbury Law Group, PLLC

(57) ABSTRACT

Various embodiments provide methods for Internet Protocol (IP) packet handling. Various embodiments may enable downlink (DL) data prioritization of IP packets for time-sensitive applications, for example by using differentiated services code point (DSCP) indications or type-of-service (TOS) indications in headers of the IP packets to distinguish prioritized IP packets from non-prioritized IP packets. In various embodiments, IP packets that are prioritized IP packets may be sent to another processor of a wireless device using a prioritized traffic handling configuration that has a lower latency than a default traffic handling configuration used for sending non-prioritized IP packets. Various embodiments may further enable uplink (UL) data prioritization of IP packets.

23 Claims, 15 Drawing Sheets

(51) Int. Cl.
  *H04L 12/46* (2006.01)
  *H04L 47/2408* (2022.01)
  *H04L 47/2483* (2022.01)

(52) U.S. Cl.
  CPC ...... *H04L 47/2408* (2013.01); *H04L 47/2483* (2013.01); *G06F 2213/0026* (2013.01); *G06F 2213/0042* (2013.01)

(58) Field of Classification Search
  CPC .............. H04W 28/0252; H04W 40/04; H04L 12/4679; H04L 47/2408; H04L 47/2483; H04L 47/24; H04L 45/22
  See application file for complete search history.

(56) References Cited

U.S. PATENT DOCUMENTS

| | | | | |
|---|---|---|---|---|
| 10,123,346 | B1* | 11/2018 | Liu | H04W 28/0263 |
| 10,292,095 | B1* | 5/2019 | Park | H04W 48/20 |
| 10,356,014 | B2* | 7/2019 | Alsup | H04L 49/90 |
| 11,265,883 | B1* | 3/2022 | Parihar | H04W 72/046 |
| 2004/0045032 | A1* | 3/2004 | Cummings | H04L 12/2801 725/111 |
| 2005/0122906 | A1* | 6/2005 | Yazaki | H04L 47/2408 370/230.1 |
| 2006/0182118 | A1 | 8/2006 | Lam et al. | |
| 2011/0044168 | A1* | 2/2011 | N Das | H04W 28/0289 370/232 |
| 2011/0096717 | A1* | 4/2011 | Kim | H04L 5/0073 370/328 |
| 2012/0033563 | A1* | 2/2012 | Jazra | H04W 28/065 370/252 |
| 2012/0092991 | A1* | 4/2012 | Jeong | H04W 28/0236 370/235 |
| 2012/0265919 | A1* | 10/2012 | Jono | G06F 13/4059 710/316 |
| 2012/0307147 | A1* | 12/2012 | Kondareddy | H04W 72/569 370/474 |
| 2013/0182685 | A1* | 7/2013 | Yu | H04W 52/0229 370/336 |
| 2014/0269738 | A1* | 9/2014 | Pierson | H04L 49/101 370/400 |
| 2015/0043554 | A1* | 2/2015 | Meylan | H04W 76/16 370/338 |
| 2015/0324568 | A1 | 11/2015 | Publicover et al. | |
| 2017/0090988 | A1* | 3/2017 | Young | G06F 9/5094 |
| 2018/0132173 | A1* | 5/2018 | Miramonti | H04W 48/18 |
| 2018/0150410 | A1* | 5/2018 | Dimer | H04L 63/0428 |
| 2018/0173661 | A1* | 6/2018 | Rand | G06F 13/4282 |
| 2019/0045421 | A1 | 2/2019 | Shah et al. | |
| 2020/0065150 | A1* | 2/2020 | Wang | G06F 3/067 |
| 2020/0128619 | A1* | 4/2020 | Damnjanovic | H04W 88/04 |
| 2020/0137611 | A1* | 4/2020 | Majmundar | H04W 28/0247 |
| 2020/0196183 | A1 | 6/2020 | Mehta et al. | |

* cited by examiner

DOWNLINK DATA PRIORITIZATION FOR TIME-SENSITIVE APPLICATIONS

BACKGROUND

Cellular and wireless communication technologies have seen explosive growth over the past several years and are being used to support communications between a host of different types of communication devices, such as smartphones, vehicle-based communication devices, infrastructure communication devices, network communication devices, etc. This growth has been fueled by better communications hardware, larger networks, and more reliable protocols.

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of technologies that can benefit from low latency data delivery, such as robotic head-mounted-devices (HMD), Internet of Things (JOT) devices, vehicles, etc. While many devices may benefit from latency data delivery, such as devices running time-sensitive applications, constraints associated with some devices, such as power consumption constraints, data aggregation constraints, interrupt moderations, etc., have previously hindered the speed of data traffic delivery to applications on such constrained devices.

SUMMARY

Various aspects include systems and methods for Internet Protocol (IP) packet handling performed by a processor of a wireless device. Various aspects may enable downlink (DL) data prioritization of IP packets for time-sensitive applications using differentiated services code point (DSCP) indications or type-of-service (TOS) indications in headers of the IP packets. Various aspects may include receiving an IP packet of a downlink (DL) data stream, determining whether the IP packet is a prioritized packet; and sending the IP packet to another processor of the wireless device using a prioritized traffic handling configuration in response to determining that the IP packet is a prioritized packet, wherein the prioritized traffic handling configuration is configured to have a lower latency than a default traffic handling configuration used for sending non-prioritized IP packets. In some aspects, receiving the IP packet of the DL data stream may include receiving the IP packet of the DL data stream after layer 2 (L2) on the wireless device.

In some aspects, the prioritized traffic handling configuration may include using a first type hardware connection, and the default traffic handling configuration may use a second type hardware connection that is different than the first type hardware connection. In some aspects, the first type hardware connection may be a peripheral component interconnect express (PCIe) connection and the second type hardware connection is a universal serial bus (USB).

In some aspects, determining whether the IP packet is a prioritized packet may include determining a parameter of the IP packet, determining whether the parameter is associated with a prioritized packet setting, determining that the IP packet is not a prioritized packet in response to determining that the parameter is not associated with a prioritized packet setting, and determining that the IP packet is a prioritized packet in response to determining that the parameter is associated with a prioritized packet setting. In some aspects, the parameter may include a differentiated services code point (DSCP) indication or type-of-service (TOS) indication in a header of the IP packet. In some aspects, the parameter may include one of an IP version 4 (IPv4) five-tuple of the IP packet, an IP version 6 (IPv6) five-tuple of the IP packet, an Evolved Packet Switched System (EPS) bearer identifier (ID) associated with the IP packet, a data radio bearer (DRB) ID associated with the IP packet, a packet data network (PDN) ID associated with the IP packet, a protocol data unit (PDU) session ID associated with the IP packet, an access point name (APN) associated with the IP packet, a data network name (DNN) associated with the IP packet, a service data adaptation protocol (SDAP) flow associated with the IP packet, a quality-of-service (QoS) class identifier (CQI) of a bearer associated with the IP packet, a Fifth Generation (5G) QoS Identifier (5QI) associated with the IP packet, a QoS Flow ID (QFI) associated with the IP packet, or a virtual local area network (VLAN) ID tag associated with the IP packet.

Some aspects may further include selecting the prioritized traffic handling configuration from a plurality of available prioritized traffic handling configurations in response to determining that the IP packet is a prioritized packet. In some aspects, the IP packet may be an IP packet for a separate device wired or wirelessly connected to the wireless device. In some aspects, the other processor may be a modem processor of the wireless device providing a wireless connection between the wireless device and a head-mounted device or a vehicle computing device.

Some aspects may further include receiving a second IP packet of an uplink (UL) data stream, determining whether the second IP packet is a prioritized packet, and sending the second IP packet to a radio access network (RAN) using an UL prioritized traffic handling configuration in response to determining that the second IP packet is a prioritized packet, wherein the UL prioritized traffic handling configuration is configured to have a lower latency than a default UL traffic handling configuration used for sending non-prioritized IP packets.

Further aspects include a wireless device having a processor configured with processor-executable instructions to perform operations of any of the methods summarized above. Various aspects include a wireless device having means for performing functions of any of the methods summarized above. Various aspects include a non-transitory processor-readable medium having stored thereon processor-executable instructions configured to cause a processor of a wireless device to perform operations of any of the methods summarized above. Further aspects include a vehicle including a vehicle computing device having a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a computing device for use in a vehicle and configured to perform operations of any of the methods summarized above. Further aspects include a vehicle having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
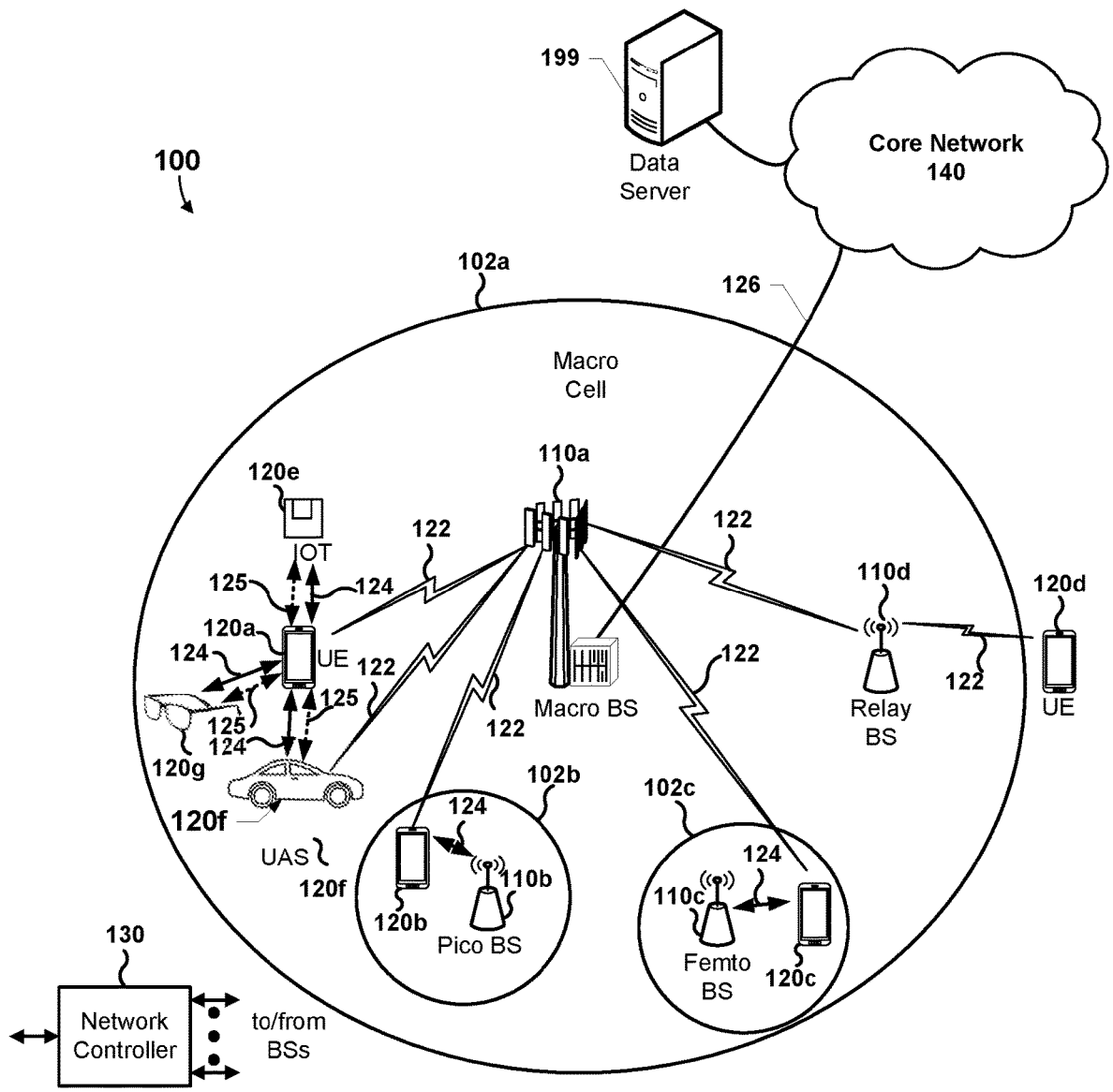
FIG. 1A is a system block diagram illustrating an example communication system suitable for implementing various embodiments.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide methods for Internet Protocol (IP) packet handling that enable downlink (DL) data prioritization of IP packets for time-sensitive applications. Various embodiments may use differentiated services code point (DSCP) indications or type-of-service (TOS) indications in headers of the IP packets to distinguish prioritized IP packets from non-prioritized IP packets. IP packets that are prioritized IP packets may be sent to another processor of a wireless device using a prioritized traffic handling configuration that has a lower latency than a default traffic handling configuration used for sending non-prioritized IP packets.

The use of a lower latency prioritized traffic handling configuration in various embodiments may improve (e.g., reduce) edge-to-edge latency (i.e., the time taken from physical layer receipt of an IP packet in the DL stream by a modem processor to delivery of the decoded IP packet to another processor of the wireless device) of prioritized IP packets on a wireless device in comparison to current systems that do not prioritize IP packets for a DL stream (e.g., current systems that merely apply best effort handling to each IP packet of a DL stream). Various embodiments may further enable uplink (UL) data prioritization of IP packets. The prioritization of IP packets on a UL stream may improve (e.g., reduce) overall latency real-time UL data traffic in comparison to current systems that do not prioritize IP packets for a UL stream.

The term "wireless device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, biometric sensors/devices, wearable devices including smart watches, smart clothing, smart glasses, smart wrist bands, smart jewelry (e.g., smart rings, smart bracelets, etc.), head-mounted devices, entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "IoT device" is used herein to refer to any of a variety of devices including a processor and transceiver for communicating with other devices or a network. For ease of description, examples of IoT devices are described as communicating via radio frequency (RF) wireless communication links, but IoT devices may communicate via wired or wireless communication links with another device (or user), for example, as a participant in a communication network, such as the IoT. Such communications may include communications with another wireless device, a base station (including a cellular communication network base station and an IoT base station), an access point (including an IoT access point), or other wireless devices.

Various embodiments may be implemented in devices that are capable of transmitting and receiving RF signals according to any of the Institute of Electrical and Electronics Engineers (IEEE)16.11 standards, or any of the IEEE 802.11 standards, the Bluetooth® standard (e.g., Bluetooth 4, Bluetooth 5, etc.), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as an IEEE 802.15.4 protocol (for example, Thread, ZigBee, and Z-Wave), 6LoWPAN, Bluetooth Low Energy (BLE), LTE Machine-Type Communication (LTE MTC), Narrow Band LTE (NB-LTE), Cellular IoT (CIoT), Narrow Band IoT (NB-IoT), BT Smart, Wi-Fi (e.g., Wi-Fi NAN, etc.), LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), Weightless, or a system utilizing 3G, 4G or 5G, Cellular V2X or further implementations thereof, technology.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single IoT device. The proximity of the SOCs facilitates high speed communications and the sharing of memory and resources.

Various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

The phrase "head-mounted device" and the acronym (HMD) is used herein to refer to any electronic display system that is wearable and presents the user with at least some computer-generated imagery. HMDs may present just computer-generated imagery or a combination of computer-generated imagery and real-world images from a user's physical environment (i.e., what the user would see without the glasses). HMDs may enable the user to view the generated image in the context of the real-world scene. Non-limiting examples of head-mounted devices include, or may be included in, helmets, eyeglasses, virtual reality (VR) glasses, augmented reality (AR) glasses, mixed reality (MR) glasses, extended reality (XR) headsets (e.g., headsets providing VR, AR, MR, and/or other type immersive or semi-immersive visual experiences), electronic goggles, and other similar technologies/devices. A head-mounted device may include various hardware elements, such as a processor, a memory, a display, one or more cameras (e.g., world-view camera, gaze-view camera, etc.), and a wireless interface for connecting with the Internet, a network, or another computing device. In some embodiments, the head-mounted device processor may be configured to perform or execute an XR software application.

In some embodiments a head-mounted device may be an accessory for and/or receive information from a wireless device (e.g., desktop, laptop, Smartphone, tablet computer, etc.), with all or portions of the processing being performed on the processor of that wireless device. As such, in various embodiments, the head-mounted device may be configured to perform all processing locally on the processor in the head-mounted device, offload all of the main processing to a processor in another computing device (e.g. a laptop present in the same room as the head-mounted device, etc.), or split the main processing operations between the processor in the head-mounted device and the processor in the other computing device. In some embodiments, the processor in the other computing device may be a server in "the cloud" with which the processor in the head-mounted device or in an associated wireless device communicates via a network connection (e.g., a cellular network connection to the Internet).

Various types of data traffic delivered to a wireless device (e.g., a smartphone) may have low latency requirements, such as XR real-time data, data for vehicle systems (e.g., Android® Auto data, Apple® Carplay data, etc.), gaming applications, and the like. However, in current systems, requirements to reduce power consumption by the wireless device and to support high throughput, have resulted in data traffic handling configurations that apply several data accumulation methodologies, data aggregation methodologies, and interrupt moderation to incoming data to the wireless device, specifically to incoming IP packets. These current systems also treat all IP packets equally. The various data traffic handling configurations applied by current systems lead to higher latency times for current systems than are desired for many applications, such as XR visual processing, audio data output (e.g., via Android® Auto, Apple Carplay, etc.), gaming applications, and other low latency requirement applications.

As a specific example, the XR visual processing pipeline is both compute intensive and latency sensitive. In some XR implementations, when an XR user wearing an HMD moves their head, the on-device processing determines the head pose and sends the head pose information to the edge cloud through a low-latency, high quality-of-service 5G link via a connected wireless device (e.g., a smartphone). The edge cloud may use the head pose to partially render the next frame, encode the data, and send the next frame data back as one or more IP packets to the XR headset via the connected wireless device (e.g., the smartphone). The XR headset will decode the latest available data and based on the latest head pose, which is being generated at a high frequency, perform any further rendering and adjustment to minimize motion-to-photon latency. In many implementations, motion-to-photon processing happens completely on the HMD device to meet the less than 20 millisecond (ms) latency requirement for XR visual processing which corresponds to the general threshold for avoiding user discomfort.

Various embodiments provide methods for IP packet handling that may be performed by a processor of a wireless device, such as a wireless device connected (e.g., wired and/or wirelessly) to a HMD, a wireless device connected (e.g., wired and/or wirelessly) to a IoT device, a wireless device connected (e.g., wired and/or wirelessly) to a vehicle computing device, etc. Various embodiments may enable DL and/or UL data prioritization of IP packets, such as for IP packets for time-sensitive applications (e.g., XR applications, vehicle applications, etc.). Various embodiments may enable prioritized IP packets to be distinguished from non-prioritized IP packets based on one or more parameters of a received IP packet.

In various embodiments, parameters of an IP packet that may distinguish a prioritized packet from a non-prioritized packet may include any of: an IP version 4 (IPv4) five-tuple of the IP packet; an IP version 6 (IPv6) five-tuple of the IP packet; an Evolved Packet Switched System (EPS) bearer identifier (ID) associated with the IP packet; a data radio bearer (DRB) ID associated with the IP packet; a packet data network (PDN) ID associated with the IP packet; a protocol data unit (PDU) session ID associated with the IP packet; an access point name (APN) associated with the IP packet; a data network name (DNN) associated with the IP packet; a service data adaptation protocol (SDAP) flow associated with the IP packet; a quality-of-service (QoS) class identifier (CQI) of a bearer associated with the IP packet; a Fifth Generation (5G) QoS Identifier (5QI) associated with the IP packet; a QoS Flow ID (QFI) associated with the IP packet; a virtual local area network (VLAN) ID tag associated with the IP packet; a DSCP indication in a header of the IP packet; and/or a TOS indication in a header of the IP packet. A processor may consider any of these parameters to distinguish prioritized IP packets from non-prioritized IP packets.

In various embodiments, distinguishing between prioritized IP packets based on one or more parameters of a received IP packet may enable prioritized packets to be handled using different prioritized traffic handling configurations than a default traffic handling configuration used for non-prioritized packets. In various embodiments, a prioritized traffic handling configuration may be a traffic handling configuration configured to have a lower latency than a default traffic handling configuration used for sending non-prioritized IP packets. For example, a prioritized traffic handling configuration may avoid some accumulation, aggregation, and/or interrupt moderation methodologies applied to the non-prioritized IP packets in the default traffic handling configuration. In some embodiments, a prioritized traffic handling configuration may have separate packet processing queues from a default traffic handling configuration. In some embodiments, a prioritized traffic handling configuration may use different hardware connections than a default traffic handling configuration. In some embodiments, a prioritized traffic handling configuration may have separate watermarks and/or buffers from a default traffic handling configuration. In some embodiments, a prioritized traffic handling configuration may have separate traffic flow control triggers from a default traffic handling configuration. In some embodiments, using a prioritized traffic handling configuration for DL data streams and/or UL data streams may enable prioritized packets to have reduced (or no) artifacts in comparison to non-prioritized packets processed using the default traffic handling configuration. Specifically, prioritized traffic handling configurations for DL data streams and/or UL data streams may reduce or avoid packet accumulation in the DL or UL path and/or may reduce or avoid packet aggregation (such as timer, packet, and/or byte based accumulation or aggregation) in the DL or UL path. The reduction (or avoidance) of artifacts in comparison to non-prioritized packets processed using the default traffic handling configuration may improve the user-experience.

In some embodiments, a wireless device may be configured with a plurality of different prioritized traffic handling configurations such that different prioritized packets may be handled using different prioritized traffic handling configurations. In some embodiments, a prioritized traffic handling configuration may be selected from a plurality of available prioritized traffic handling configurations. For example, certain prioritized packets may be handled with one prioritized traffic handling configuration while other prioritized packets may be handled with another prioritized traffic handling configurations. As another example, different traffic channels may be associated with different priorities and those priorities may be used to throttle data with different accumulation and/or aggregation controls.

In some embodiments, different prioritization indications, such as different DSCP indications or different TOS indications in a header of an IP packet, may be associated with different prioritized traffic handling configurations. For example, a first priority indication may be associated with a first prioritized traffic handling configuration having an edge-to-edge latency on the wireless device of 5 ms, a second priority indication may be associated with a second prioritized traffic handling configuration having an edge-to-edge latency on the wireless device of 10 ms, and a third priority indication may be associated with a third prioritized traffic handling configuration having an edge-to-edge latency on the wireless device of 15 ms. In this manner, the selection of the first, second, or third priority indication or parameter for an IP packet may control the selection of the prioritized traffic handling configuration at the wireless device any may be used to manage a desired latency budget for a service.

In some embodiments, determining whether an IP packet is a prioritized packet may include determining whether a DSCP indication or TOS indication in a header of the IP packet is associated with a prioritized packet setting. For example, a device sending an IP packet via a radio access network (RAN)(e.g., a 5G RAN) to a wireless device, such as an XR server, a content server, etc., may mark the header of a prioritized IP packet with a DSCP indication or TOS indication associated with a prioritized packet setting. In some embodiments, a processor of a wireless device, such as a modem processor (e.g., a 5G modem processor), receiving the IP packet with the DSCP indication or the TOS indication in the header of the IP packet associated with a prioritized packet setting may determine that the IP packet is a prioritized packet and may send the IP packet to another processor of the wireless device, such as a Wi-Fi modem processor, application processor, etc., using a prioritized traffic handling configuration in response to determining that the IP packet is a prioritized packet.

In some embodiments, the prioritized traffic handling configuration may include a different type hardware connection between the processor receiving the IP packet and the processor to which the IP packet is sent than is used in the default traffic handling configuration. The type of hardware connection may be agnostic to periodization as long as hardware can distinguish using separate connections, such as PCIe, USB, HSIC etc. As a specific example, based on the prioritized traffic handling configuration a 5G modem processor of a wireless device may send IP packets determined to be prioritized packets to a Wi-Fi modem processor using a PCIe connection between the Wi-Fi modem processor and the 5G modem processor while IP packets determined not to be prioritized packets may be sent from the 5G modem processor to an application processor using a USB connection according to the default traffic handling configuration. As another specific example, based on the prioritized traffic handling configuration a 5G modem processor of a wireless device may send IP packets determined to be prioritized packets to a Wi-Fi modem processor using a PCIe connection between the Wi-Fi modem processor and the 5G modem processor without any accumulation, queuing, or aggregation processing being applied to the prioritized packets while IP packets determined not to be prioritized packets may be sent from the 5G modem processor to the Wi-Fi modem processor using a USB connection according to the default traffic handling configuration where at least some accumulation, queuing, or aggregation processing may be applied.

Various embodiments may reduce edge-to-edge latency on a wireless device in various different technology implementations, such as IoT systems, interconnected systems, dual chipset systems, vehicle systems, etc. As an example, some embodiments may be used in IoT Time Sensitive Networks (TSNs) to distinguish prioritized IP packets from non-prioritized IP packets and handle prioritized IP packets with lower latency traffic handling configurations. As another example, some embodiments may be used with various different types of physical interconnects to provide lower latency traffic handling configurations for prioritized IP packets, such as WLAN, Ethernet, USB, PCIe, etc. As another example, some embodiments may be used in LAN-to-LAN connections to distinguish prioritized IP packets from non-prioritized IP packets and handle prioritized IP packets with lower latency traffic handling configurations. As another example, some embodiments may be used in dual chipset wireless devices in which a modem processor may be connected to a 5 GHz Wi-Fi chipset and a 2.4 GHz chipset to distinguish prioritized IP packets from non-prioritized IP packets and handle prioritized IP packets with the 5 GHz Wi-Fi chipset and the non-prioritized IP packets with the 2.4 GHz chipset. As another example, some embodiments may be used in connected vehicle implementations, such as implementations in which a wireless device is connected to a vehicle computing device via an Android® Auto type connection or Apple® Car Play type connection, to distinguish prioritized IP packets from non-prioritized IP packets (e.g., via EPS bearer ID, VLAN tag mapping, etc.) and handle prioritized IP packets with a lower latency traffic handling configuration for provisioning the prioritized IP packets from the wireless device to the vehicle computing device.

FIG. 1A is a system block diagram illustrating an example communication system 100 suitable for implementing any of Various embodiments. The communications system 100 may be a 5G New Radio (NR) network, or any other suitable network such as an LTE network, 5G (or later generation) network, etc. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of devices (for example illustrated as user equipment (UE) 120a-120d, IoT device 120e, vehicle 120f, and HMD 120g in FIG. 1A). The communications system 100 may also include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an Evolved Packet Core (EPC) network), 5G core network, etc. While the communications system 100 is discussed with reference to various examples of types of wireless devices 120a-120g, such as UEs, IoT devices, HMDs, vehicles, etc., these are merely examples and the wireless devices 120a-120g may be any type device, such as a robot, vehicle, infrastructure device, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device (e.g., user equipment (UE)) 120a-120g may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device (e.g., UE) or a base station). A relay station also may be a mobile device that can relay transmissions for other wireless devices. In the example illustrated in FIG. 1A, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (e.g., UEs, vehicles, HMDs, etc.) 120a, 120b, 120b, 120c, 120e, 120d, 120f, 120g may be dispersed throughout communications system 100, and each wireless device may be stationary or mobile. A wireless device also may be referred to as an access terminal, a terminal, a mobile station, a subscriber unit, a station, user equipment (UE), broadcast wireless device (BWD), Internet of Things (IoT) device, vehicle computing device, head mounted display (HMD), etc.

A macro base station 110a may communicate with the communication network 140 over a wired or wireless communication link 126. The wireless devices 120a, 120b, 120c, 120f may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE). Additionally, wired communication links 125 may be established between devices in the communications system 100 via physical wired connections between devices, such as such as universal serial bus (USB) connections, peripheral component interconnect express (PCIe) connections, universal serial bus (USB) connections, high speed inter-chip (HSIC) connections, Ethernet connections, etc.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A wireless device (e.g., UE) 120a-g may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE radio access network (RAN) side of the 5G NSA network and 5G/NR RAT in the 5G/NR RAN side of the 5G NSA network. The 4G/LTE RAN and the 5G/NR RAN may both connect to one another and a 4G/LTE core network (e.g., an EPC network) in a 5G NSA network. The RAN may be comprised of the base stations 110a-110d and the RAN may connect to the core network 140. The RAN may also be referred to as a wireless wide area network (WWAN).

In some embodiments, two or more wireless devices 120a-g (for example, illustrated as the wireless device 120a and the IoT device 120e or wireless device 120a and vehicle 120f or wireless device 120a and HMD 120g) may communicate directly using one or more sidelink channels 124 (for example, without using a base station 110a-110d as an intermediary to communicate with one another). For example, wireless device 120a-g may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a C-V2X protocol, Bluetooth communications, Wi-Fi communications, a mesh network, or similar networks, or combinations thereof. In this case, the wireless device 120a-g may perform scheduling operations, resource selection operations, as well as other operations described elsewhere herein as being performed by the base station 110a. The communications between the two or more wireless devices 120a-g (for example, illustrated as the wireless device 120a and the IoT device 120e or wireless device 120a and vehicle 120f or wireless device 120a and HMD 120g) may establish a wireless local area network (WLAN) between the two or more wireless devices 120a-g. In some embodiments, two or more wireless devices 120a-g (for example, illustrated as the wireless device 120a and the IoT device 120e or wireless device 120a and vehicle 120f or wireless device 120a and HMD 120g) may be connected together by one or more wired connections (e.g., via USB connections, PCIe connections, etc.) and may communicate directly using wired communication links 125 when physically connected.

In some embodiments, one or more data servers 199 may provide data to, and/or receive data from, one or more of the wireless devices 120a-g via the core network 140. The data server 199 may send prioritized and/or non-prioritized IP packets to the wireless devices 120a-g in downlink (DL) streams. As a specific example, in a DL stream, prioritized and/or non-prioritized IP packets from the data server 199 may be sent to the core network 140 by an edge router, the core network 140 may send the prioritized and/or non-prioritized IP packets to the base station 110a for transmission to the wireless device 120a (e.g., via 5G DL data transmissions), and the wireless device 120a may receive the prioritized and/or non-prioritized IP packets and send the prioritized and/or non-prioritized IP packets on one of the wireless devices 120e, 120f, 120g (e.g., via a Wi-Fi transmission). The data server 199 may receive prioritized and/or non-prioritized IP packets from the wireless devices 120a-g in uplink (UL) streams. As a specific example, in a UL stream, prioritized and/or non-prioritized IP packets from one of the wireless devices 120e, 120f, 120g may be sent to the wireless device 120a (e.g., via a Wi-Fi transmission), the wireless device 120a may send the prioritized and/or non-prioritized IP packets to the base station 110a (e.g., via 5G UL data transmissions), and the base station 110a may send the prioritized and/or non-prioritized IP packets to the core network 140 for forwarding to the data sever 199 via an edge router.

Figure 1B:
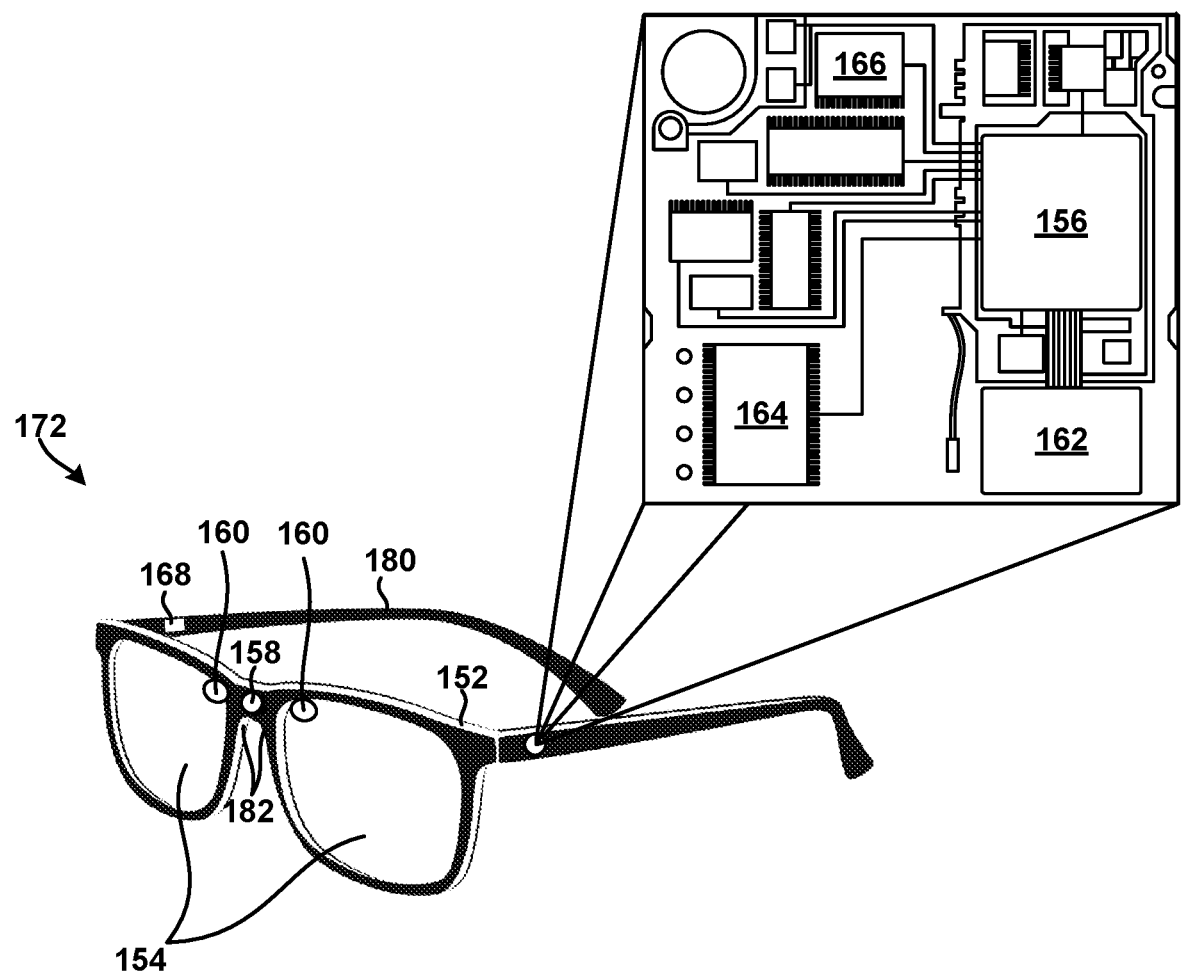
FIG. 1B is an illustration of a head-mounted device (e.g., an extended reality (XR) headset) suitable for implementing various embodiments.

FIG. 1B illustrates a head-mounted device 172 that may be configured in accordance with various embodiments. With reference to FIGS. 1A and 1B, in the example illustrated in FIG. 1A, a head-mounted device 172 may be a specific implementation of a wireless device (e.g., HMD 120g), such as an XR headset. The example head-mounted device 172 includes a frame 152, two optical lenses 154, and a processor 156 that is communicatively coupled to outward facing world-view image sensors/cameras 158, inward facing gaze-view sensors/cameras 160, a sensor array 162, a memory 164, and communication circuitry 166. In some embodiments, the communication circuitry 166 may support one or more RATs and/or wired connections to support communications among various devices as described in system 100 with reference to FIG. 1A. In some embodiments, the head-mounted device 172 may include capacitance touch sensing circuits along the arms 180 of the frame or in a nose bridge 182 of the head-mounted device 172. In some embodiments, the head-mounted device 172 may also include sensors for monitoring physical conditions (e.g., location, motion, acceleration, orientation, altitude, etc.). The sensors may include any or all of a gyroscope, an accelerometer, a magnetometer, a magnetic compass, an altimeter, an odometer, and a pressure sensor. The sensors may also include various bio-sensors (e.g., heart rate monitor, body temperature sensor, carbon sensor, oxygen sensor, etc.) for collecting information pertaining to environment and/or user conditions. The sensors may also be external to the head-mounted device 172 and paired or grouped to the head-mounted device 172 via a wired or wireless connection (e.g., Bluetooth®, etc.).

In some embodiments, the processor 156 may also be communicatively coupled to an image rendering device 168 (e.g., an image projector), which may be embedded in arm portions 180 of the frame 152 and configured to project images onto the optical lenses 154. In some embodiments, the image rendering device 168 may include a light-emitting diode (LED) module, a light tunnel, a homogenizing lens, an optical display, a fold mirror, or other components well known projectors or head-mounted displays. In some embodiments (e.g., those in which the image rendering device 168 is not included or used), the optical lenses 154 may be, or may include, see-through or partially see-through electronic displays. In some embodiments, the optical lenses 154 include image-producing elements, such as see-through Organic Light-Emitting Diode (OLED) display elements or liquid crystal on silicon (LCOS) display elements. In some embodiments, the optical lenses 154 may include independent left-eye and right-eye display elements. In some embodiments, the optical lenses 154 may include or operate as a light guide for delivering light from the display elements to the eyes of a wearer.

The outward facing or world-view image sensors/cameras 158 may be configured to capture real-world images from a user's physical environment, and send the corresponding image data to the processor 156. The processor 156 may combine the real-world images with computer-generated imagery or virtual objects (VOs) to generate an augmented scene, and render the augmented scene on the electronic displays or optical lenses 154 of the head-mounted device 172.

The inward facing or gaze-view sensors/cameras 160 may be configured to acquire image data from the user's eyes or the facial structure surrounding the user's eyes.

Figure 2A:
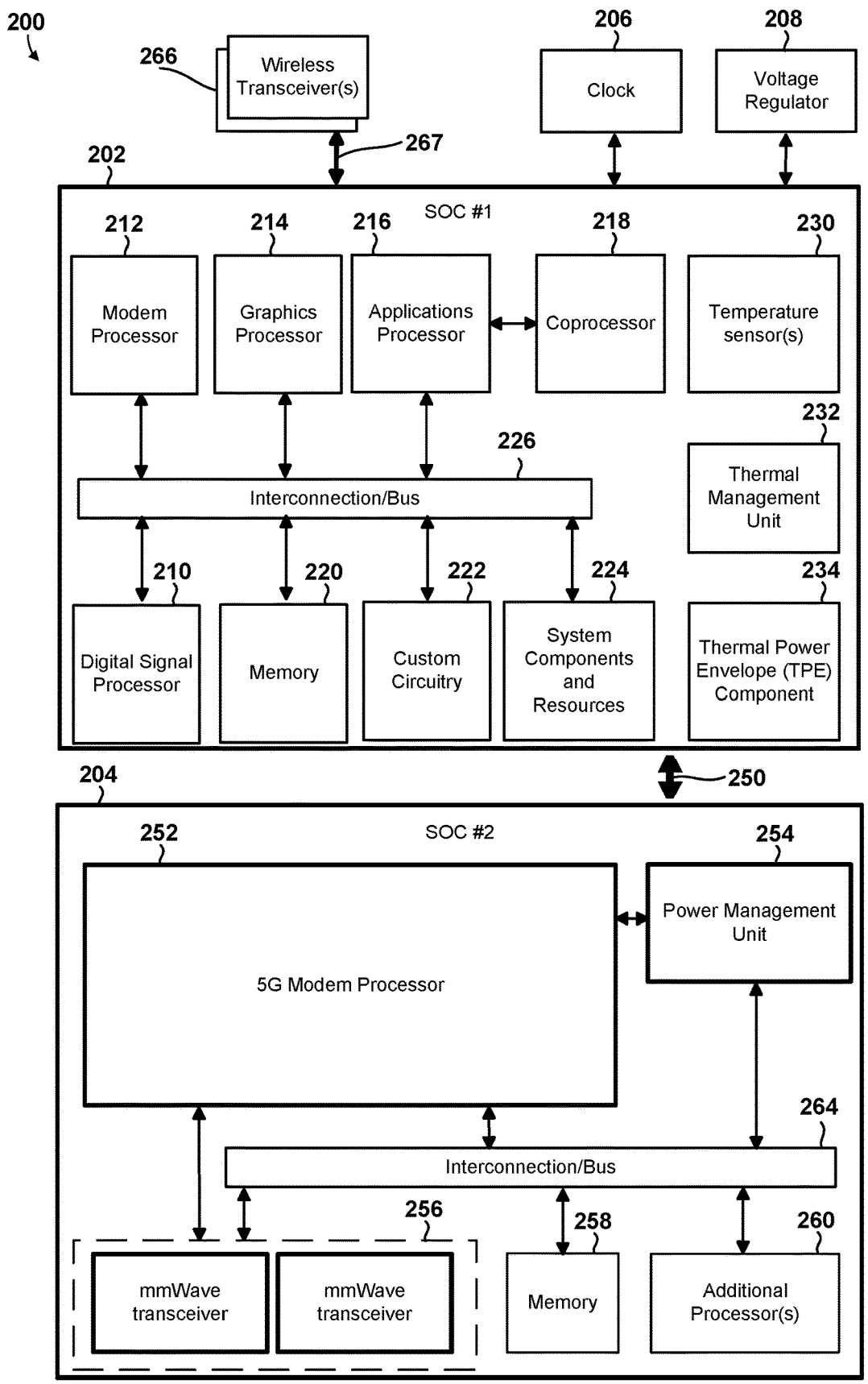
FIG. 2A is a component block diagram illustrating an example computing and wireless modem system suitable for implementing various embodiments.

FIG. 2A is a component block diagram illustrating an example computing and wireless modem system 200 suitable for implementing various embodiments. Various embodiments may be implemented on a number of single processor and multiprocessor computer systems, including a system-on-chip (SOC) or system in a package (SIP With reference to FIGS. 1A-2A, the illustrated example wireless device 200 (which may be a SIP in some embodiments) includes a two SOCs 202, 204 coupled to a clock 206, a voltage regulator 208, and one or more wireless transceivers 266 configured to send and receive wireless communications via an antenna (not shown) to/from network wireless devices, such as a base station 110a, and/or other wireless device (e.g., wireless devices 120a-g). In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G (or later generation) processing unit responsible for managing high volume, high speed (e.g., 5 Gbps, etc.), and/or very high frequency short wave length (e.g., 28 GHz mmWave spectrum, etc.) communications. In some embodiments, the wireless transceivers 266 may be wireless transceivers configured to support peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), Bluetooth communications, Wi-Fi communications, etc. In some embodiments, the wireless transceivers 266 may each be connected to the first SOC 202 and/or the second SOC 204 may be connected to each of one or more wireless transceivers 266 by various physical connections 267 (also referred to as interconnects, buses, etc.), such as peripheral component interconnect express (PCIe) connections, universal serial bus (USB) connections, high speed inter-chip (HSIC) connections, Ethernet connections, etc. In various embodiments, the first SOC 202 and/or the second SOC 204 may be configured to selectively send data, such as IP packets, to the wireless transceivers 266 using different ones of the connections 267. For example, one connection 267 may be used for prioritized IP packets, while another connection 267 may be a default connection used for IP packets that are not prioritized.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.)

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, other devices (e.g., devices connected via one or more wired connections, such as USB connections, PCIe connections, etc.), etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). The interconnection/bus module 226, 250, 264 may be physical connections between the various processors, 210, 212, 214, 216, 218, 252, 260, such as PCIe connections, USB connections, HSIC connections, Ethernet connections, etc. Communications may be provided by advanced interconnects, such as high-performance networks-on chip (NoCs). In various embodiments, the various processors, 210, 212, 214, 216, 218, 252, 260 may be configured to selectively send data, such as IP packets, to one another, as well as the transceivers 256, 266, using different ones of the connections 267 and/or interconnection/bus module 226, 250, 264. For example, one or more of the connections 267 and/or interconnection/bus modules 226, 250, 264 may be used for prioritized IP packets, while others of the connections 267 and/or interconnection/bus modules 226, 250, 264 may be default connections used for IP packets that are not prioritized.

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 2B:
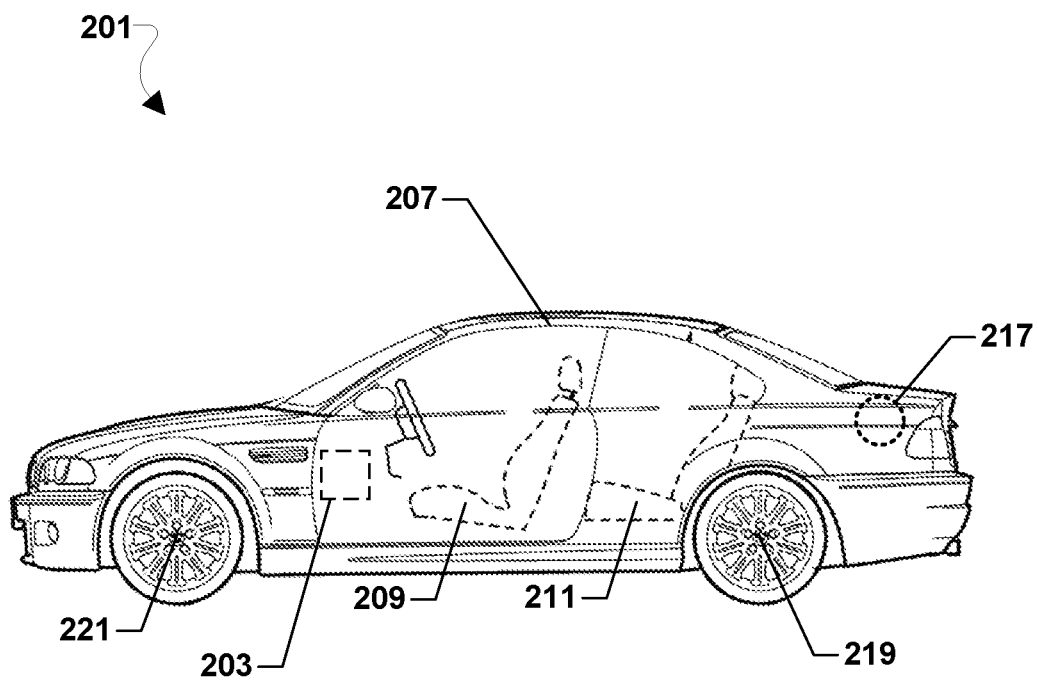
FIGS. 2B and 2C are component block diagrams illustrating a vehicle suitable for implementing various embodiments.
Figure 2C:
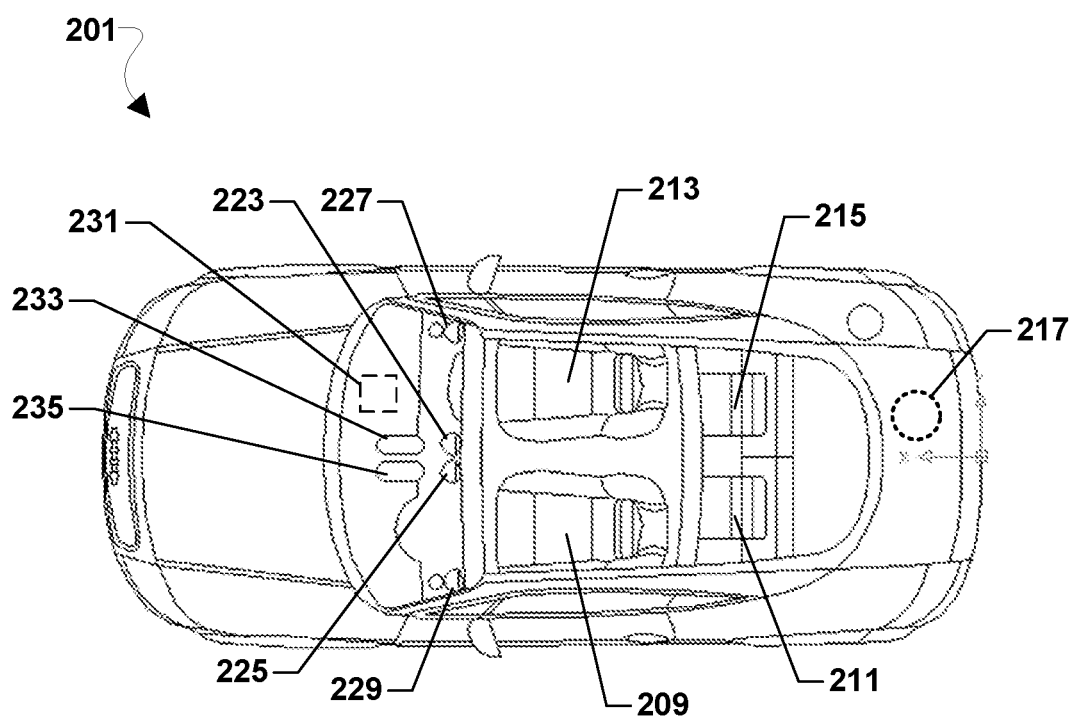

Various embodiments may be implemented within a variety of vehicles, an example vehicle 201 of which is illustrated in FIGS. 2B and 2C. With reference to FIGS. 1A-2C, a vehicle 201 (e.g., vehicle 120f) may include a vehicle computing device 203 (also referred to as an in-vehicle communication device), one or more displays or infotainment units 231, and a plurality of sensors, including satellite geopositioning system receivers 207, occupancy sensors 209, 211, 213, 215, 217, tire pressure sensors 219, 221, cameras 223, 225, microphones 227, 229, radar 233, and lidar 235.

The plurality of sensors, disposed in or on the vehicle 201, may be used for various purposes, such as autonomous and semi-autonomous navigation and control, crash avoidance, position determination, etc., as well to provide sensor data regarding objects and people in or on the vehicle 201. The sensors may include one or more of a wide variety of sensors capable of detecting a variety of information useful for navigation and collision avoidance. Each of the sensors may be in wired or wireless communication with a vehicle computing device 203, as well as with each other. In particular, the sensors may include one or more cameras 223, 225 or other optical sensors or photo optic sensors. The sensors may further include other types of object detection and ranging sensors, such as radar 233, lidar 235, IR sensors, and ultrasonic sensors. The sensors may further include tire pressure sensors 219, 221, humidity sensors, temperature sensors, satellite geopositioning sensors 207, accelerometers, vibration sensors, gyroscopes, gravimeters, impact sensors, force meters, stress meters, strain sensors, fluid sensors, chemical sensors, gas content analyzers, pH sensors, radiation sensors, Geiger counters, neutron detectors, biological material sensors, microphones 227, 229, occupancy sensors 209, 211, 213, 215, 217, proximity sensors, and other sensors.

The vehicle computing device 203, which is sometimes referred to as an onboard unit (OBU), may be configured with processor-executable instructions to perform various embodiments using information received from various sensors. In some embodiments, the vehicle computing device 203 may supplement the processing of camera images using distance and relative position (e.g., relative bearing angle) that may be obtained from radar 233 and/or lidar 235 sensors. The vehicle computing device 203 may further be configured to control steering, breaking and speed of the vehicle 203 when operating in an autonomous or semi-autonomous mode using information regarding other vehicles determined using various embodiments.

The vehicle computing device 203 may be configured to exchange wireless communications with other communication devices around a vehicle 120f in which the vehicle computing device 203 is located. The vehicle 201 may be any type of vehicle, such as an autonomous vehicle (e.g., driverless car, etc.), semi-autonomous vehicle, remotely operated vehicle, etc. The vehicle computing device 203 may be a computing device mounted in the vehicle 201 or may be a mobile communication device (e.g., a smartphone, laptop, etc.) temporarily placed within the vehicle 201.

The vehicle computing device 203 may be configured to output graphical user interfaces (GUIs) to vehicle 201 occupants on one or more displays or infotainment units 231. The vehicle computing device 203 may establish connections to wireless devices (e.g., 120a-d and 120g) within the vehicle 201. As specific examples, the vehicle computing device may establish a wired (e.g., via a USB connection) and/or wireless (e.g., via Wi-Fi) Android Auto or Apple CarPlay connection with a wireless device 120d to receive IP packets from the wireless device 120d and send IP packets to the wireless device 120d.

Figure 3:
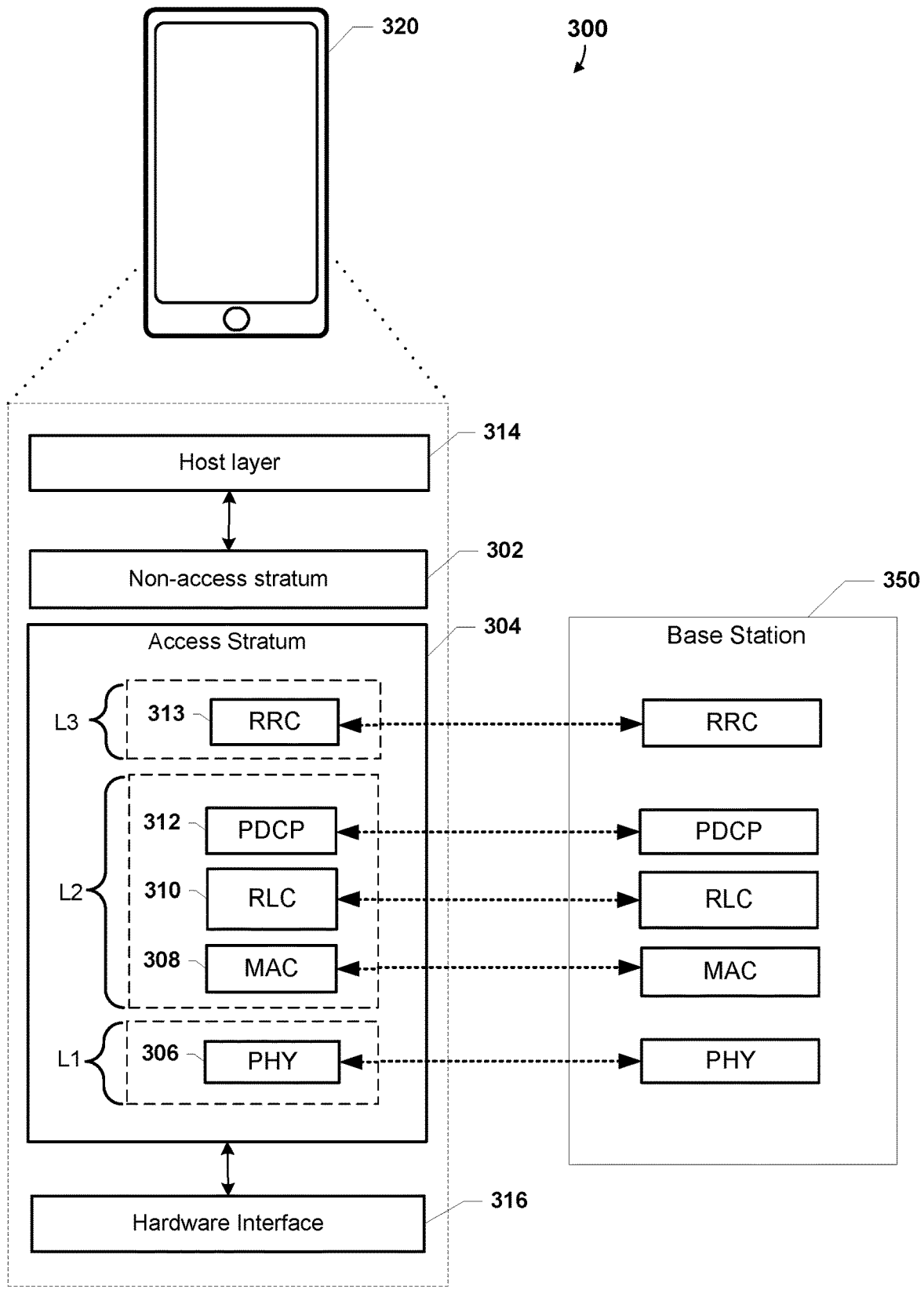
FIG. 3 is a component block diagram illustrating a software architecture including a radio protocol stack for the user and control planes in wireless communications suitable for implementing various embodiments.

FIG. 3 illustrates an example of a software architecture 300 including a radio protocol stack for the user and control planes in wireless communications between a base station 350 (e.g., the base station 110a) and a wireless device 320 (e.g., the wireless device 120a-120g, 172, 200, 270, 203). With reference to FIGS. 1A-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In Various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In some embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
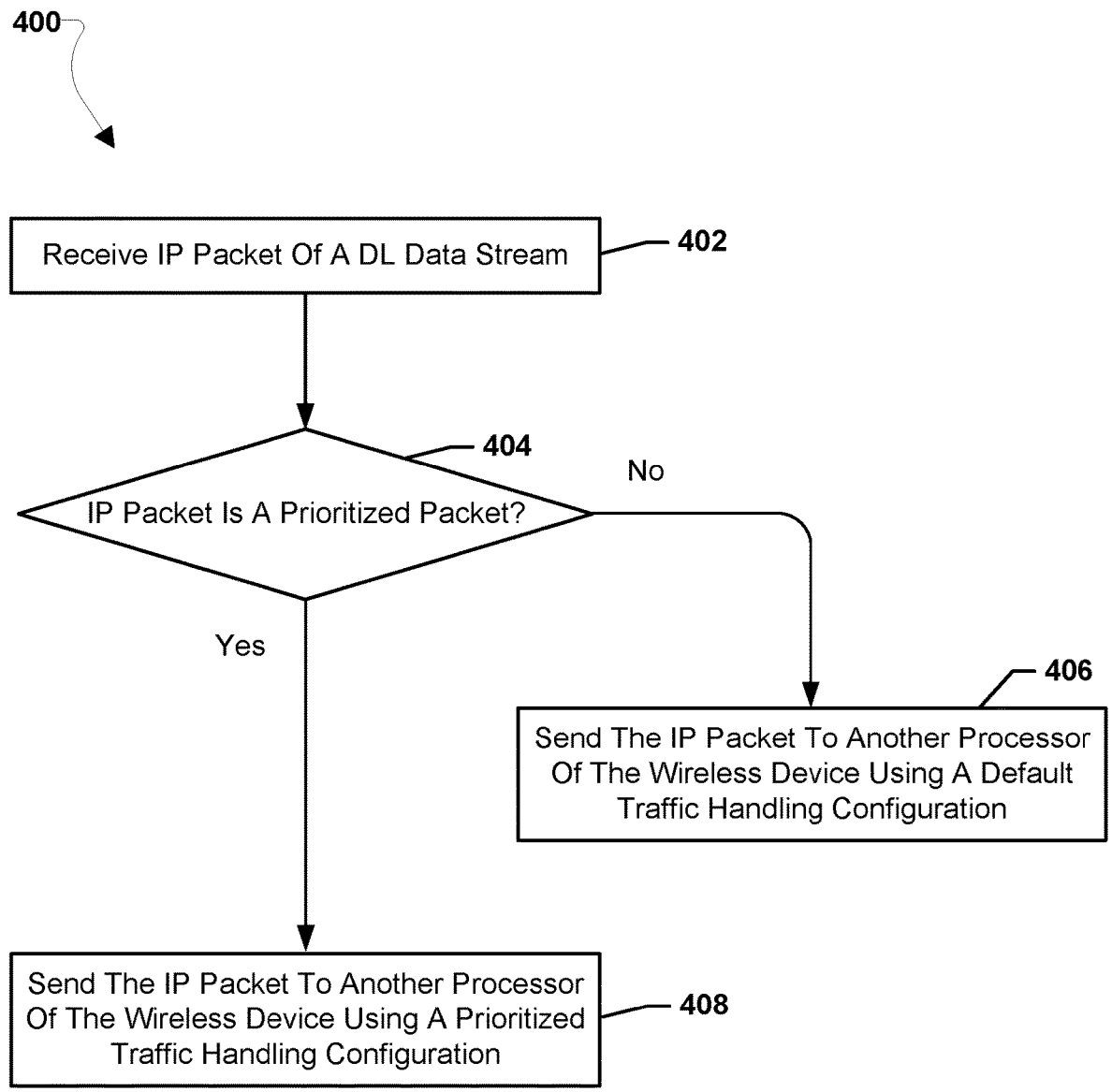
FIG. 4 is a process flow diagram illustrating a method for Internet Protocol (IP) packet handling according to various embodiments.

FIG. 4 is a process flow diagram illustrating a method 400 for IP packet handling according to various embodiments. With reference to FIGS. 1A-4, the method 400 may be performed by a processor (e.g., 156, 210, 212, 214, 216, 218, 252, 260) of a wireless device (e.g., the wireless device 120a-120g, 172, 200, 203, 320). As one specific example, the operations of the method 400 may be performed by a 5G modem processor (e.g., 252) of a wireless device (e.g., the wireless device 120a-120g 172, 200, 203, 320) to send IP packets received from a 5G RAN to another processor of the wireless device, such as a modem processor (e.g., 212) connected to a wireless transceiver (e.g., 266), an applications processor (e.g., 216), etc.

In block 402, the processor may perform operations including receiving an IP packet of a DL data stream. Receiving an IP packet of a DL data stream may include decoding the received IP packet from a wireless transmission received from a RAN to which the wireless device is connected. Receiving the IP packet of the DL data stream may include receiving the IP packet of the DL data stream after L1 and/or L2 processing on the wireless device As a specific example, the IP packet may be received via 5G RAT transmissions from a gNB (e.g., base station 110*a*) and decoded via L1 and L2 processing by a 5G modem processor (e.g., 252) of the wireless device. In various embodiments, receiving the IP packet of the DL data stream may include receiving the IP packet at a traffic management module from a L2 sublayer (e.g., a PDCP sublayer 312).

In determination block 404, the processor may perform operations including determining whether the IP packet is a prioritized packet. In various embodiments, determining whether the IP packet is a prioritized packet may include performing operations to determine a parameter of the IP packet distinguishing a prioritized packet from a non-prioritized packet. In various embodiments, parameters of an IP packet that may distinguish a prioritized packet from a non-prioritized packet may include an IPv4 five-tuple of the IP packet, an IPv6 five-tuple of the IP packet, an EPS bearer ID associated with the IP packet, a DRB ID associated with the IP packet, a PDN ID associated with the IP packet, a PDU session ID associated with the IP packet, an APN associated with the IP packet, a DNN associated with the IP packet, a SDAP flow associated with the IP packet, a CQI of a bearer associated with the IP packet, a 5QI associated with the IP packet, a QFI associated with the IP packet, a VLAN ID tag associated with the IP packet, a DSCP indication in a header of the IP packet, and/or a TOS indication in a header of the IP packet. For example, specific parameters and/or combinations of parameters may be associated with prioritized packets. The presence of those parameters may indicate that the IP packet is prioritized and the absence of those parameters may indicate that the IP packet is not prioritized. As a specific example, the DSCP decimal value 46 (i.e., binary value 101 110) indicated in the header of an IPv6 packet may indicate that the IP packet is a priority packet. The lack of a DSCP indicated in the header of an IPv6 packet or a DSCP decimal value of 0 (i.e., binary value 000 000) may indicate that the IP packet is not a priority packet. As another specific example, the TOS decimal value 5 i.e., binary value 101) indicated in the header of an IPv4 packet may indicate that the IP packet is a priority packet. The lack of a TOS indicated in the header of an IPv4 packet or a TOS decimal value of 0 (i.e., binary value 000) may indicate that the IP packet is not a priority packet.

In response to determining that the IP packet is not a prioritized packet (i.e., determination block 404="No"), the processor may perform operations including sending the IP packet to another processor of the wireless device using a default traffic handling configuration in block 406. In various embodiments, a default traffic handling configuration may be a traffic handling configuration used for IP packets that are not prioritized. The default traffic handling configuration may include accumulation, aggregation, and/or interrupt moderation methodologies applied to the non-prioritized IP packets to prioritize throughput and power saving in IP packet handling.

In response to determining that the IP packet is a prioritized packet (i.e., determination block 404="Yes"), the processor may perform operations including sending the IP packet to another processor of the wireless device using a prioritized traffic handling configuration in block 408. In some embodiments, the prioritized traffic handling configuration may be configured to have a lower latency than a default traffic handling configuration used for sending non-prioritized IP packets. In some embodiments, a prioritized traffic handling configuration may be a traffic handling configuration configured to have a lower latency than a default traffic handling configuration used for sending non-prioritized IP packets. For example, a prioritized traffic handling configuration may avoid some accumulation, aggregation, and/or interrupt moderation methodologies applied to the non-prioritized IP packets in the default traffic handling configuration. In some embodiments, a prioritized traffic handling configuration may have separate packet processing queues from a default traffic handling configuration. In some embodiments, a prioritized traffic handling configuration may use different hardware connections than a default traffic handling configuration. In some embodiments, a prioritized traffic handling configuration may have separate watermarks and/or buffers from a default traffic handling configuration. In some embodiments, a prioritized traffic handling configuration may have separate traffic flow control triggers from a default traffic handling configuration. In such embodiments, the type of hardware connection may be agnostic to prioritization as long as hardware can distinguish using separate connections, such as PCIe, USB, HSIC, etc. As an example, a prioritized traffic handling configuration may use a different type hardware connection than a default traffic handling configuration. As a specific example, a prioritized traffic handling configuration may use a PCIe connection to send the IP packet to another processor of the wireless device and the default traffic handling configuration may use a USB connection to send the IP packet to another processor of the wireless device. Other types of hardware connections may be used provided the hardware can distinguish the separate connections.

In various embodiments, the operations of the method 400 may be performed repeatedly as IP packets are received.

FIGS. 5A, 5B, 5C, and 5D are block diagrams illustrating example interactions between processors of a wireless device 515 (e.g., the wireless device 120a-120g, 172, 200, 203, 320) using a prioritized traffic handling configuration for prioritized IP packets and a default traffic handling configuration for non-prioritized IP packets according to various embodiments. With reference to FIGS. 1-5D, the interactions illustrated in FIGS. 5A, 5B, 5C, and 5D may be performed according to the operations of the method 400 (FIG. 4).

Figure 5A:
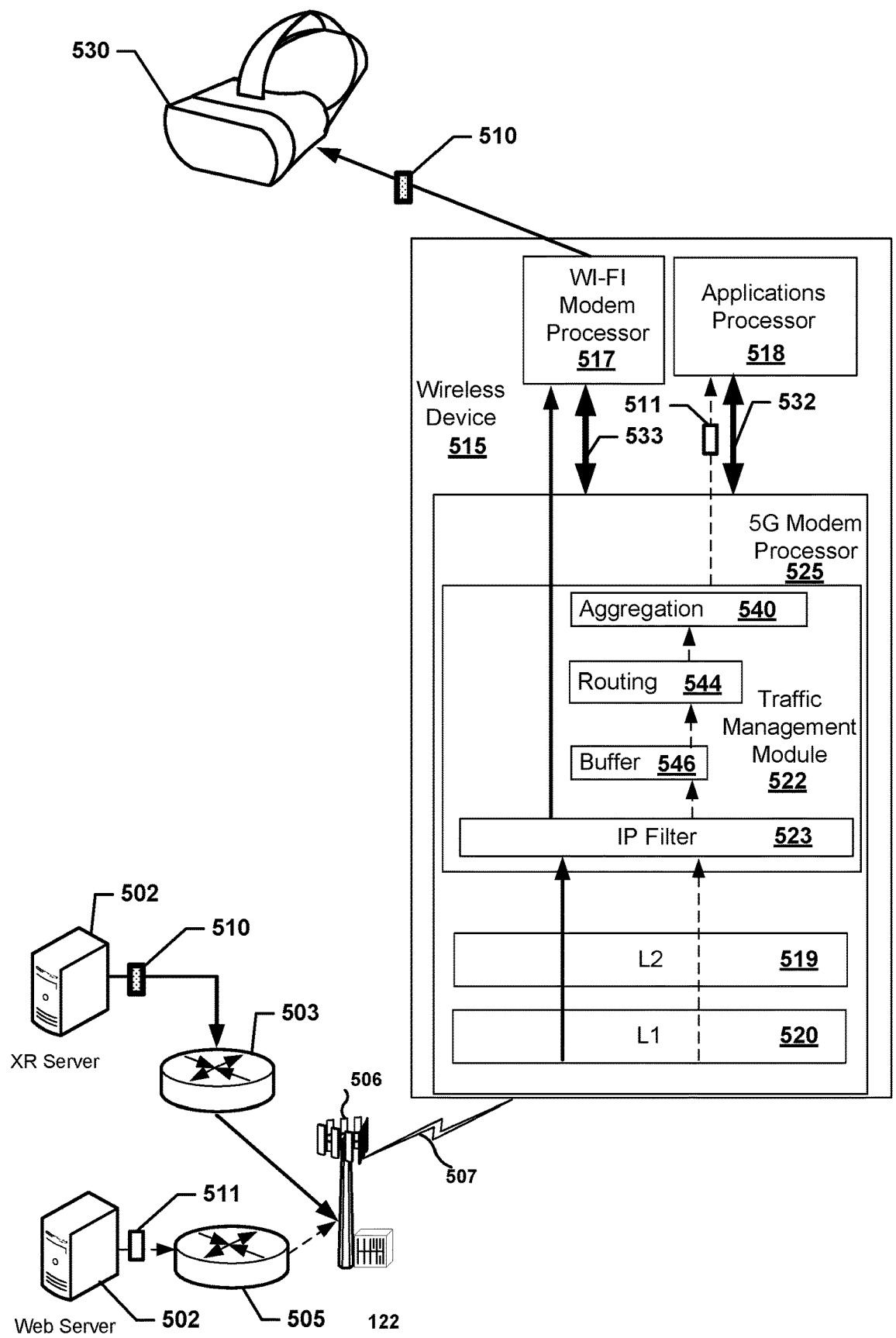
FIGS. 5A, 5B, 5C, and 5D are block diagrams illustrating example interactions between processors of a wireless device using a prioritized traffic handling configuration for prioritized IP packets and a default traffic handling configuration for non-prioritized IP packets according to various embodiments.

FIG. 5A illustrates example interactions to handle a prioritized IP packet 510 generated by a XR server and destined for (e.g., addressed to) an XR headset 530 (e.g., HMD 120g, 172). For example, the prioritized IP packet 510 may include data for a next frame of a XR scene to be rendered by the HMD 120g to a user. The prioritized IP packet 510 may include an indication in the IP packet 510 that the IP packet 510 is a prioritized packet, such as a DSCP indication (e.g., DSCP decimal value 46) or a TOS indication (e.g., TOS decimal value 5) in a header of the IP packet 510. FIG. 5A also illustrates example interactions to handle a non-prioritized IP packet 511 generated by a web server 502 and destined for (e.g., addressed to) an application running on an applications processor 518 (e.g., applications processor 216) of the wireless device 515. The non-prioritized IP packet 511 may include an indication in the IP packet 511 is routine packet for which best effort handing is sufficient, such as a DSCP indication (e.g., DSCP decimal value 0) or a TOS indication (e.g., TOS decimal value 0) in a header of the IP packet 511.

The XR server 502 may send the prioritized IP packet 510 via one or more edge routers 503 to a 5G RAN including a base station 506 providing a 5G connection 507 for a DL data stream to the wireless device 515. Similarly, the web server 511 may send the non-prioritized IP packet 511 via one or more edge routers 505 to the 5G RAN including the base station 506 providing the 5G connection 507 for a DL data stream to the wireless device 515. The 5G modem processor 525 (e.g., 5G modem processor 252) may receive the prioritized IP packet 510 and the non-prioritized IP packet 511 by processing at the L1 sublayer 520 and L2 sublayer 519 and the decoded IP packets 510, 511 may be received at a traffic management module 522 of the 5G modem processor 525.

The traffic management module 522 of the 5G modem processor 525 may include an IP filter module 523 that may determine whether a received IP packet, such as IP packet 510, 511, is a prioritized packet or not a prioritized packet. In response to determining that an IP packet is not a prioritized packet, the IP filter module 523 may use a default traffic handling configuration that sends the IP packet through a buffering module 546, routing module 544, and aggregation module 540 and on to the applications processor 518 via a hardware connection 532, such as a USB type connection. In response to determining that an IP packet is a prioritized packet, the IP filter module 523 may use a prioritized traffic handling configuration that sends the IP packet directly to the Wi-Fi modem processor 517 (e.g., modem processor 212) via a dedicated hardware connection 533, such as a PCIe type connection.

FIG. 5A illustrates that the IP filter module 523 determined that the prioritized IP packet 510 was a prioritized IP packet, for example based on the DSCP indication (e.g., DSCP decimal value 46) or the TOS indication (e.g., TOS decimal value 5) in the header of the IP packet 510 indicating that the packet is high priority or critical, and sent the prioritized IP packet 510 directly to the Wi-Fi modem processor 517 via the dedicated hardware connection 533. As such, no latency due to buffering, routing, or aggregation processing may be experience for the prioritized IP packet 510. The Wi-Fi modem processor 517 may send the prioritized IP packet 510 to the XR headset 530. FIG. 5A also illustrates that the IP filter module 523 determined that the non-prioritized IP packet 511 was not a prioritized IP packet, for example based on the DSCP indication (e.g., DSCP decimal value 0) or the TOS indication (e.g., TOS decimal value 0) in the header of the IP packet 511 indicating that the packet is routine or best effort, and sent the non-prioritized IP packet 511 to the applications processor 518 via the buffering module 546, routing module 544, and aggregation module 540 and on to the applications processor 518 via the hardware connection 532. A non-prioritized IP packet 511 may experience buffering, routing, and aggregation processing. As a result, the edge-to-edge latency experienced by the non-prioritized IP packet 511 from arriving at the wireless device 515 to arriving at the applications processor 518 may be larger than the edge-to-edge latency of the prioritized IP packet 510 from arriving at the wireless device 515 to arriving at the Wi-Fi modem processor 517.

Figure 5B:
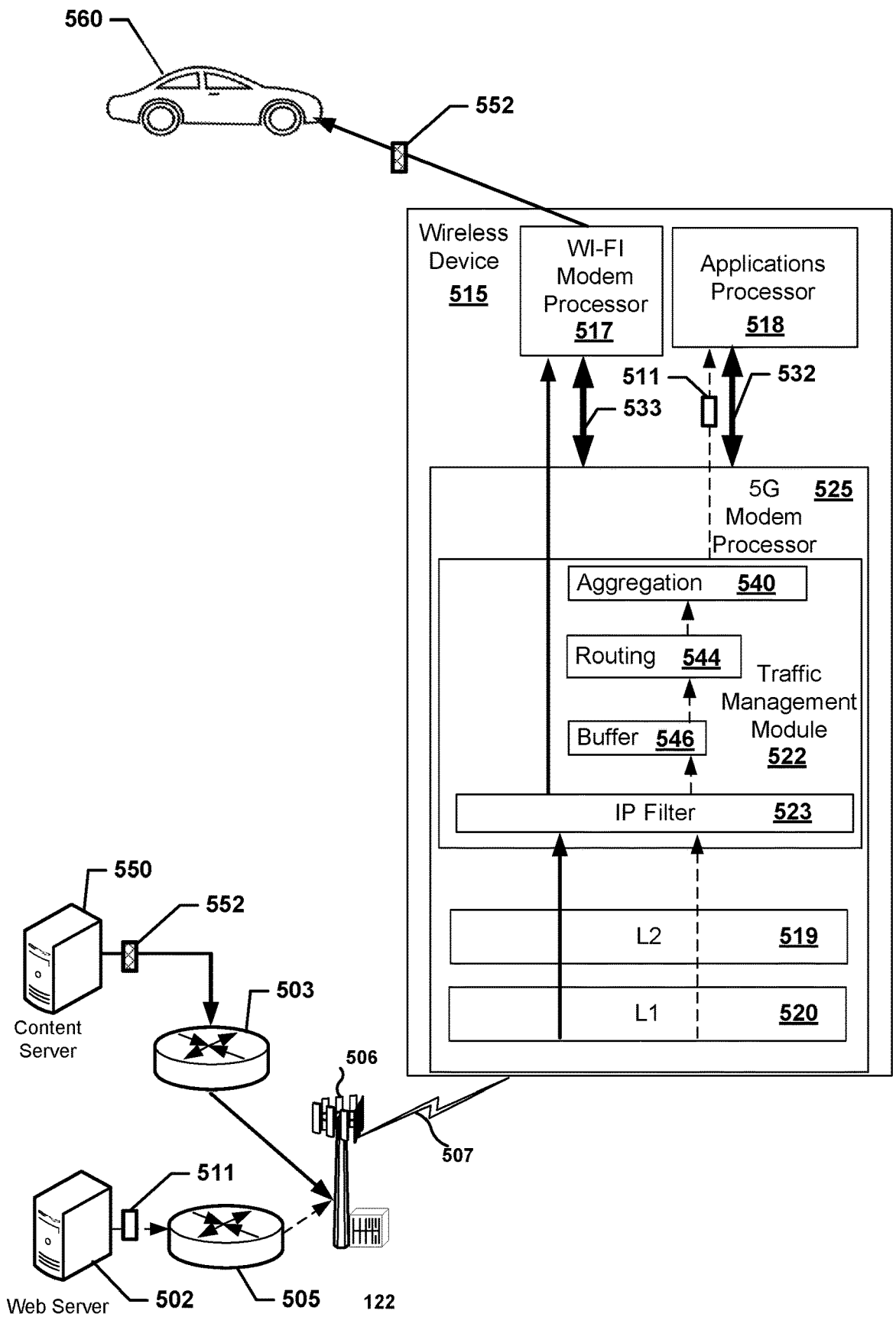

Referring to FIG. 5B, similar operations related to a non-prioritized IP packet 511 and a prioritized IP packet 552 destined for a vehicle computing device 560 (e.g., vehicle computing device 203 and/or vehicle display 231) are illustrated. The operations illustrated to handle the non-prioritized IP packet 511 may be the same as described with reference to FIG. 5A. In FIG. 5B, rather than an XR service, an in-vehicle service, such as Android Auto, Apple Car Play, etc., may be being provisioned through the 5G connection supported by the wireless device 515. A content server 550, such as a content server outputting data for an Android Auto type application or an Apple Car Play type application, may generate the prioritized IP packet destined for (or addressed to) the vehicle computing device 560. The prioritized IP packet 552 may include a parameter or indication in the IP packet 552 that the IP packet 552 is a prioritized packet, such as a via a VLAN tag in the IP packet 552. As another example, the EPS bearer ID and/or the 5QI that may be used for sending the IP packet 552 to the wireless device 515 may also indicate that the IP packet 552 is a prioritized packet.

The content server 550 may send the prioritized IP packet 552 via one or more edge routers 503 to the 5G RAN including the base station 506 providing the 5G connection 507 for a DL data stream to the wireless device 515. The 5G modem processor 525 may receive the prioritized IP packet 552 by processing at the L1 sublayer 520 and L2 sublayer 519 and the decoded IP packet 552 may be received at a traffic management module 522 of the 5G modem processor 525. FIG. 5B illustrates that the IP filter module 523 determined that the prioritized IP packet 552 was a prioritized IP packet, for example based on the VLAN tag in the IP packet 552 and/or the EPS bearer ID and/or the 5QI that may be used for sending the IP packet 552 to the wireless device 515 indicating that the packet is high priority or critical, and sent the prioritized IP packet 552 directly to the Wi-Fi modem processor 517 via the dedicated hardware connection 533. As such, no latency due to buffering, routing, or aggregation processing may be experience for the prioritized IP packet 552. The Wi-Fi modem processor 517 may send the prioritized IP packet 552 to the vehicle computing device 560. As the non-prioritized IP packet 511 experienced buffering, routing, and aggregation processing, the edge-to-edge latency experienced by the non-prioritized IP packet 511 from arriving at the wireless device 515 to arriving at the applications processor 518 may be larger than the edge-to-edge latency of the prioritized IP packet 552 from arriving at the wireless device 515 to arriving at the Wi-Fi modem processor 517.

Figure 5C:
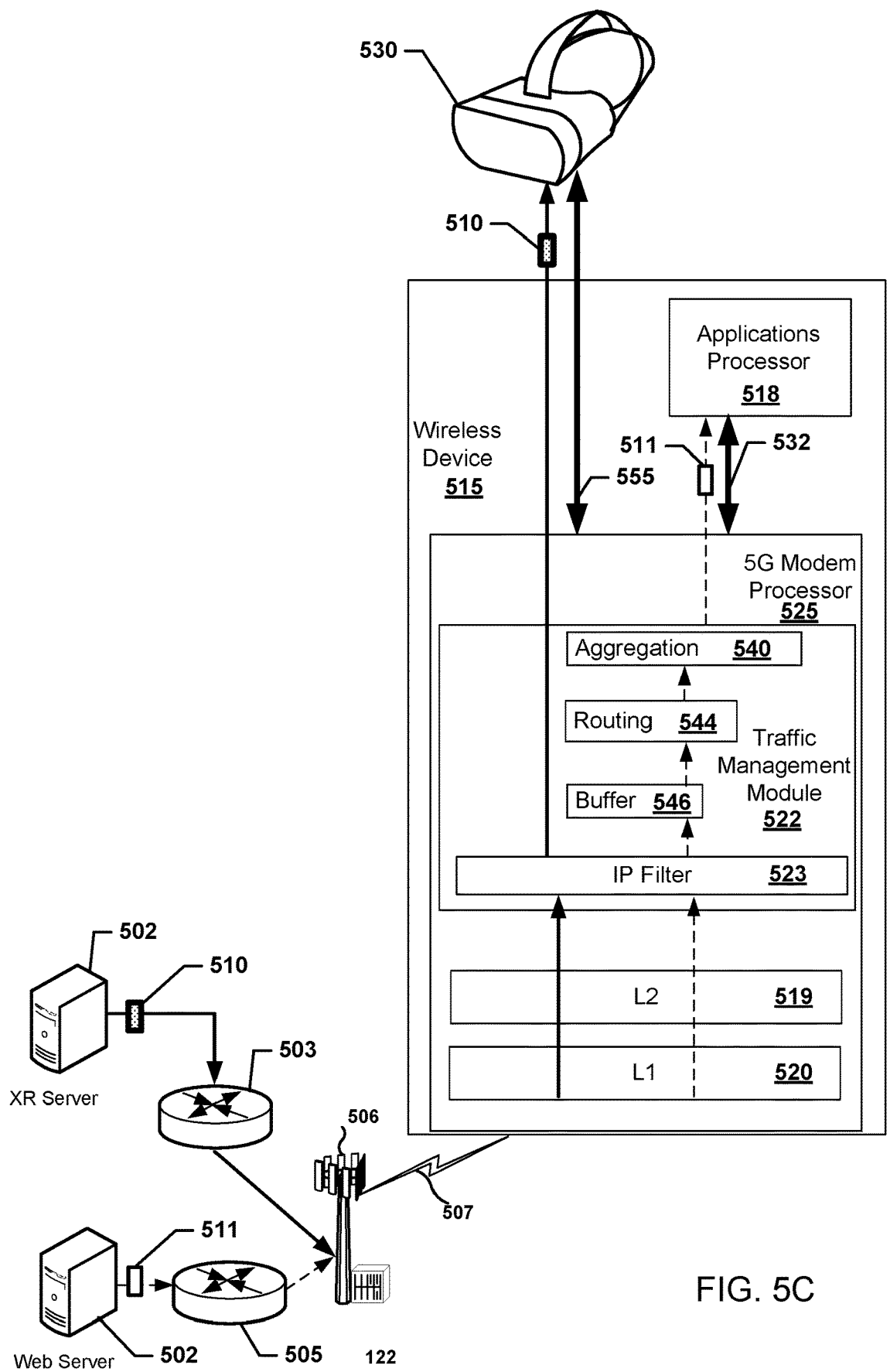

FIG. 5C illustrates operations related to a non-prioritized IP packet 511 and a prioritized IP packet 510 destined for (e.g., addressed to) the XR headset 530 similar to the operations discussed with reference to FIG. 5A, except that FIG. 5C illustrates the XR headset 530 physically connected to the wireless device 515 via a wired connection 555 (e.g., a USB type connection, PCIe type connection, etc.). The operations to handle the non-prioritized IP packet 511 illustrated in FIG. 5C may be the same as described with reference to FIG. 5A.

In the embodiment illustrated in FIG. 5C, rather than the prioritized IP packet 510 being sent directly to the Wi-Fi modem processor 517 via the dedicated hardware connection 533, the prioritized IP packet 510 may be sent directly to the XR headset 530 via the wired connection 555. In the use case illustrated in FIG. 5C, the IP filter module 523 has determined that the prioritized IP packet 510 was a prioritized IP packet. Again, this determination may be made based on the DSCP indication (e.g., DSCP decimal value 46) or the TOS indication (e.g., TOS decimal value 5) in the header of the IP packet 510 indicating that the packet is high priority or critical. Based on this determination, the IP filter module 523 has sent the prioritized IP packet 510 directly to the XR headset 530 via the wired connection 555. As such, no latency due to buffering, routing, or aggregation processing may be experience for the prioritized IP packet 510. As the non-prioritized IP packet 511 experienced buffering, routing, and aggregation processing, the edge-to-edge latency experienced by the non-prioritized IP packet 511 from arriving at the wireless device 515 to arriving at the applications processor 518 may be larger than the edge-to-edge latency of the prioritized IP packet 552 from arriving at the wireless device 515 to arriving at the XR headset 530.

Figure 5D:
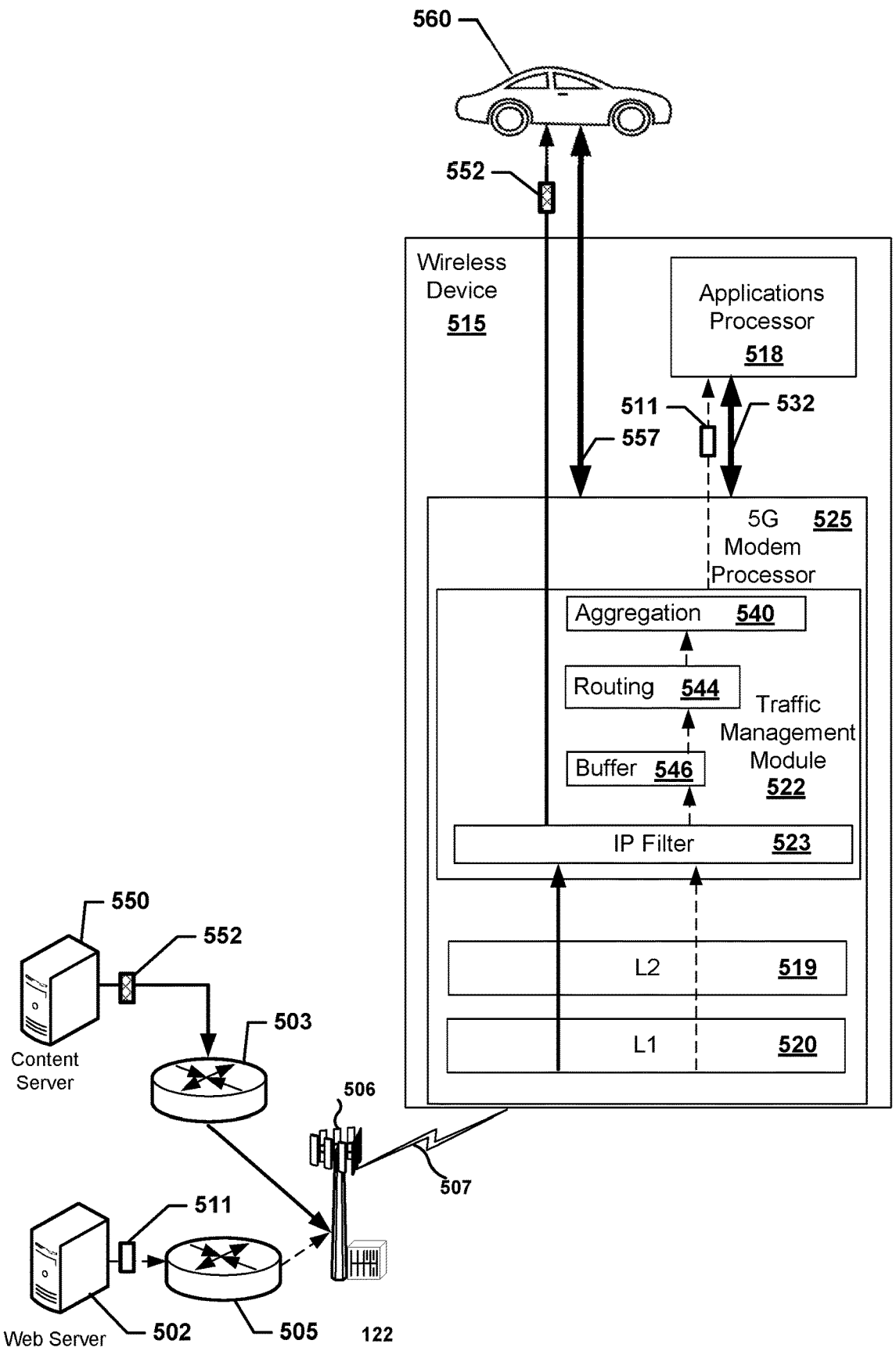

FIG. 5D illustrates operations related to a non-prioritized IP packet 511 and a prioritized IP packet 552 destined for (e.g., addressed to) a vehicle computing device 560 similar to the operations discussed with reference to FIG. 5B, except that FIG. 5D illustrates the vehicle computing device 560 physically connected to the wireless device 515 via a wired connection 557 (e.g., a USB type connection, PCIe type connection, etc.). The operations illustrated to handle the non-prioritized IP packet 511 in FIG. 5D may be the same as described with reference to FIG. 5B.

In the embodiment illustrated in FIG. 5D, rather than the prioritized IP packet 552 being sent directly to the Wi-Fi modem processor 517 via the dedicated hardware connection 533, the prioritized IP packet 510 may be sent directly to the vehicle computing device 560 via the wired connection 557. In the use case illustrated in FIG. 5D, the IP filter module 523 has determined that the prioritized IP packet 552 was a prioritized IP packet. Again, this determination may be made based on the VLAN tag in the IP packet 552 and/or the EPS bearer ID and/or the 5QI that may be used for sending the IP packet 552 to the wireless device 515 indicating that the packet is high priority or critical. Based on this determination, the IP filter module 523 has sent the prioritized IP packet 552 directly to the vehicle computing device 560 via the wired connection 557. As such, no latency due to buffering, routing, or aggregation processing may be experience for the prioritized IP packet 552. As the non-prioritized IP packet 511 experienced buffering, routing, and aggregation processing, the edge-to-edge latency experienced by the non-prioritized IP packet 511 from arriving at the wireless device 515 to arriving at the applications processor 518 may be larger than the edge-to-edge latency of the prioritized IP packet 552 from arriving at the wireless device 515 to arriving at the vehicle computing device 552.

Figure 6:
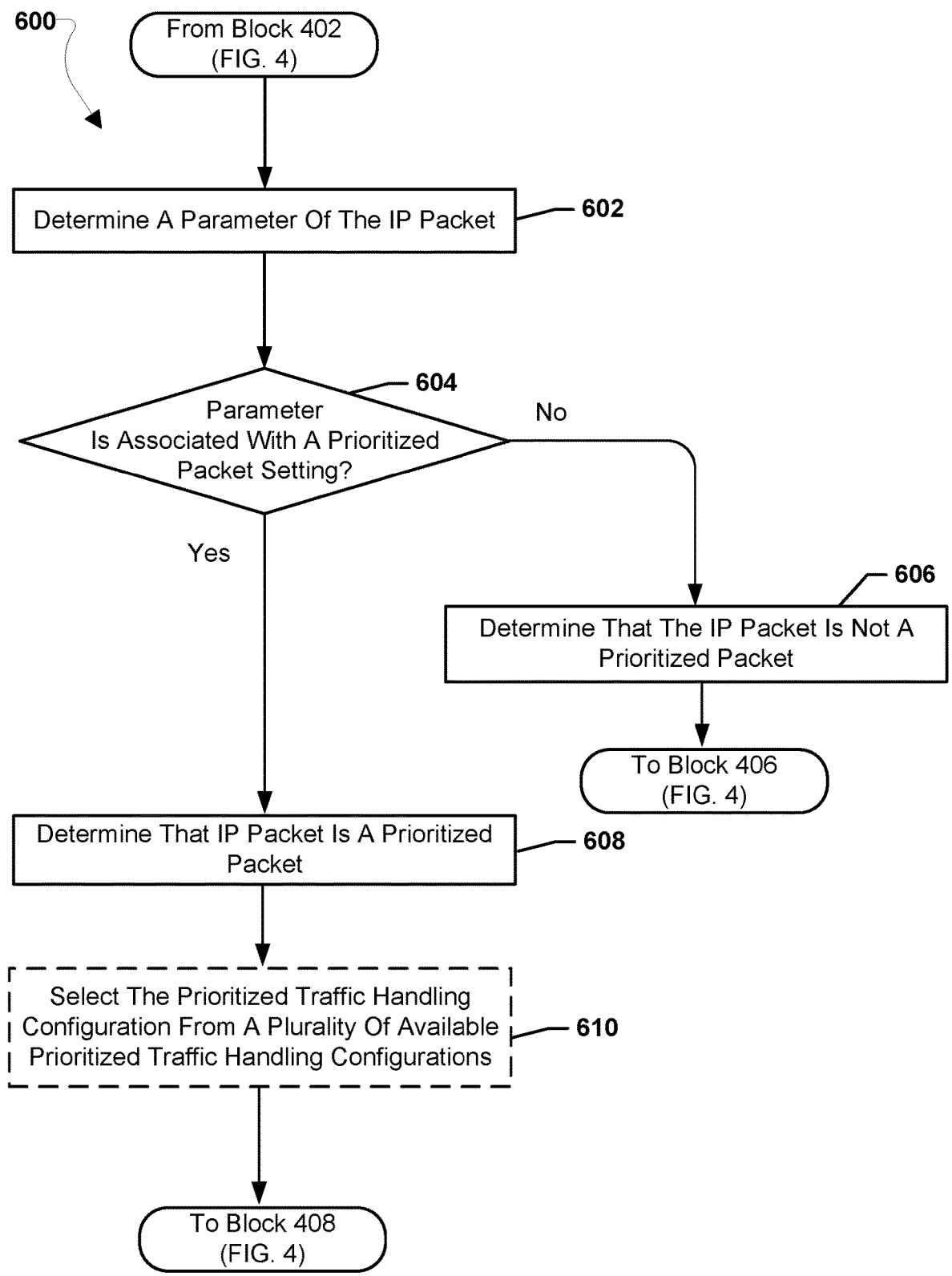
FIG. 6 is a process flow diagram illustrating a method for IP packet handling according to various embodiments.

FIG. 6 is a process flow diagram illustrating a method for IP packet handling according to various embodiments. With reference to FIGS. 1A-6, the method 600 may be performed by a processor (e.g., 156, 210, 212, 214, 216, 218, 252, 260, 525) of a wireless device (e.g., the wireless device 120a-120g, 172, 200, 203, 320, 515). As a specific example, the operations of the method 600 may be performed by a 5G modem processor (e.g., 252, 525) of a wireless device (e.g., the wireless device 120a-120g 172, 200, 203, 320, 515) connected to another processor of the wireless device, such as a modem processor (e.g., 212, 517) connected to a wireless transceiver (e.g., 266), an applications processor (e.g., 216, 518), etc. In various embodiments, the operations of the method 600 may be performed in conjunction with the operations of the method 400 (FIG. 4). As a specific example, the operations of the method 600 may be performed as part of the operations to determine whether an IP packet is a prioritized packet in block 404 of the method 400 (FIG. 4).

In block 602, the processor may perform operations including determining a parameter of the IP packet. In various embodiments, parameters of an IP packet that may be determined may include: an IPv4 five-tuple of the IP packet; an IPv6 five-tuple of the IP packet; an EPS bearer ID associated with the IP packet; a DRB ID associated with the IP packet; a PDN ID associated with the IP packet; a PDU session ID associated with the IP packet; an APN associated with the IP packet; a DNN associated with the IP packet; a SDAP flow associated with the IP packet; a CQI of a bearer associated with the IP packet; a 5QI associated with the IP packet; a QFI associated with the IP packet; a VLAN ID tag associated with the IP packet; a DSCP indication in a header of the IP packet; and/or a TOS indication in a header of the IP packet. Parameters of the IP packet may be determined in various manners, including by parsing the IP packet, determining a port on which the IP packet is received, etc.

In determination block 604, the processor may perform operations including determining whether the parameter is associated with a prioritized packet setting. In various embodiments, parameters of IP packets may be associated with one or more prioritized packet settings. The prioritized packet settings may be dynamic and/or static setting on the wireless device controlling whether or not a specific parameter or combination of parameters indicates the IP packet should be handled as a priority packet.

As a specific example, the DSCP decimal value 46 (i.e., binary value 101 110) indicated in the header of an IPv6 packet may be associated with a prioritized packet setting. As another specific example, the TOS decimal value 5 (i.e., binary value 101) indicated in the header of an IPv4 packet may be associated with a prioritized packet setting. In determination block 604 in these examples, the processor may compare the DSCP decimal value or TOS decimal value to the prioritized packet settings to determine whether the parameter is associated with a prioritized packet setting. A match between the DSCP decimal value or TOS decimal value and a prioritized packet setting may indicate that the IP packet is a prioritized packet. A lack of a match between the DSCP decimal value or TOS decimal value and a prioritized packet setting may indicate that the IP packet is not a prioritized packet.

As another specific example, a VLAN tag, EPS bearer ID, and/or a 5QI may be associated with a prioritized packet setting. In determination block 604 in this example, processor may compare the VLAN tag, EPS bearer ID, and/or a 5QI to the prioritized packet settings to determine whether the parameter is associated with a prioritized packet setting. A match between the VLAN tag, EPS bearer ID, and/or a 5QI and a prioritized packet setting may indicate that the IP packet is a prioritized packet. A lack of a match between the VLAN tag, EPS bearer ID, and/or a 5QI and a prioritized packet setting may indicate that the IP packet is not a prioritized packet.

In response to determining that the parameter does not correspond to a prioritized packet setting (i.e., determination block 604="No"), the processor may perform operations including determining that the IP packet is not a prioritized packet in response to deter mining that the parameter does not correspond to a prioritized packet setting in block 606.

In response to determining that the IP packet is not a prioritized packet, the processor may perform operations including sending the IP packet to another processor of the wireless device using a default traffic handling configuration in block 406 (FIG. 4).

In response to determining that the parameter corresponds to a prioritized packet setting (i.e., determination block 604="Yes"), the processor may perform operations including determining that the IP packet is a prioritized packet in block 608.

In optional block 610, the processor may perform operations including selecting a prioritized traffic handling configuration from a plurality of available prioritized traffic handling configurations. The operations of block 610 may be optional as there may be only a single prioritized traffic handling configuration available on a wireless device. In embodiments in which there are a plurality of prioritized traffic handling configurations available to select from, such as different latency prioritized traffic handling configurations using different hardware and/or software configurations, the processor may select the prioritized traffic handling configuration to use for the prioritized IP packet based on one or more indicators or parameters of the IP packet. For example, different DSCP indications, TOS indications, and/or VLAN tags may be associated with different prioritized traffic handling configurations and the selected prioritized traffic handling configuration may be the prioritized traffic handling configuration associated with the DSCP indications, TOS indications, and/or VLAN tags in the prioritized IP packet.

In response to determining that the IP packet is a prioritized packet or in response to selecting the prioritized traffic handling configuration, the processor may perform operations including sending the IP packet to another processor of the wireless device using a prioritized traffic handling configuration in block 408 (FIG. 4).

Figure 7:
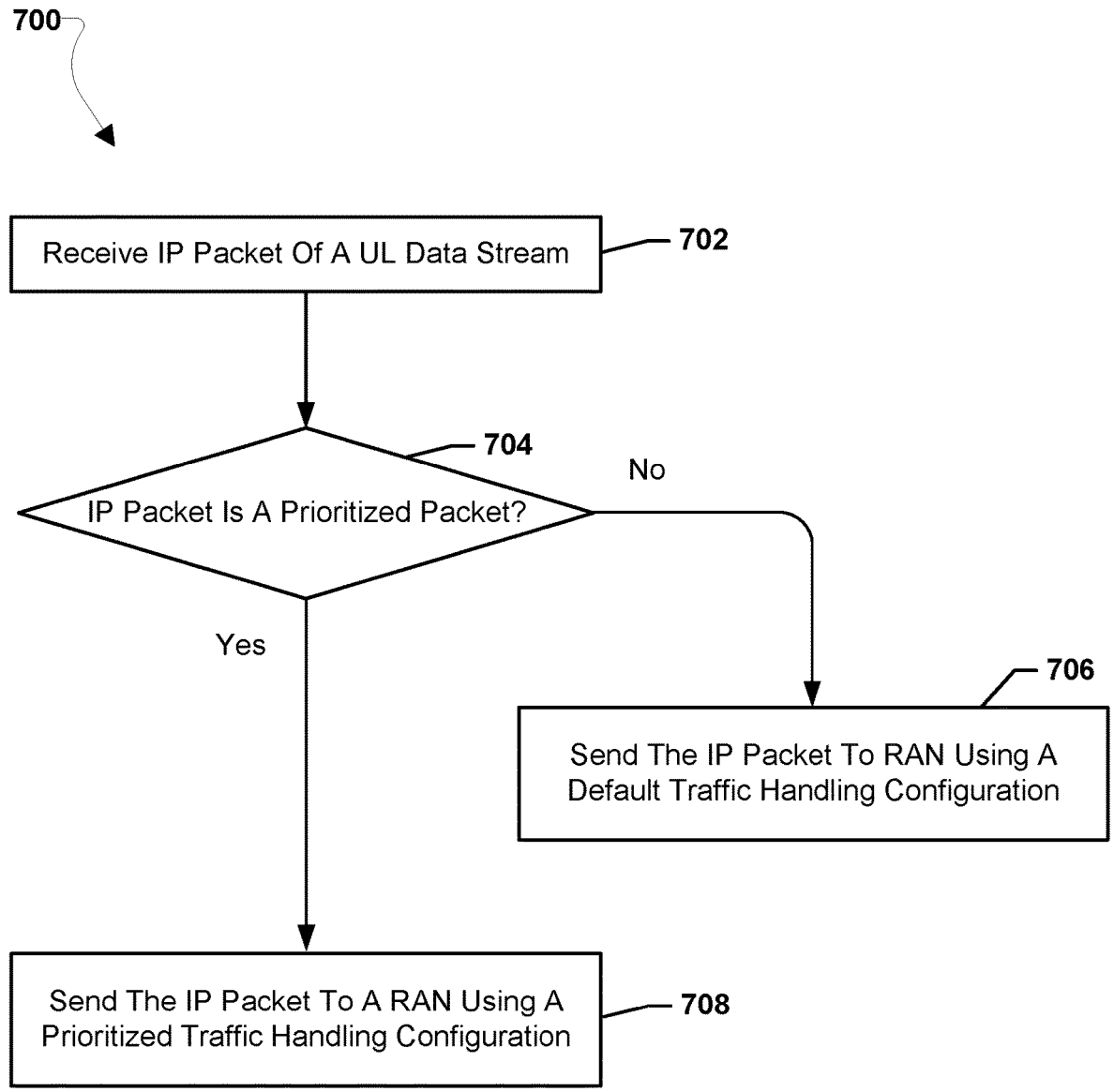
FIG. 7 is a process flow diagram illustrating a method for IP packet handling according to various embodiments.

FIG. 7 is a process flow diagram illustrating a method for IP packet handling according to various embodiments. With reference to FIGS. 1A-7, the method 700 may be performed by a processor (e.g., 156, 210, 212, 214, 216, 218, 252, 260, 525) of a wireless device (e.g., the wireless device 120a-120g, 172, 200, 203, 320, 515). As one specific example, the operations of the method 700 may be performed by a 5G modem processor (e.g., 252, 525) of a wireless device (e.g., the wireless device 120a-120g 172, 200, 203, 320, 515) connected to another processor of the wireless device, such as a modem processor (e.g., 212, 517) connected to a wireless transceiver (e.g., 266), an applications processor (e.g., 216, 518), etc. In various embodiments, the operations of the method 700 may be performed in conjunction with the operations of the method 400 (FIG. 4) and/or 600 (FIG. 6).

In block 702, the processor may perform operations including receiving an IP packet of a UL data stream. Receiving an IP packet of a UL data stream may include receiving an IP packet addressed to (or destined for) a device reachable by a wireless transmission to a RAN to which the wireless device is connected. Receiving the IP packet of the UL data stream may include receiving the IP packet of the UL data stream from a higher layer and/or other processor connected to a modem processor of the wireless device, such as a 5G modem of the wireless device.

In determination block 704, the processor may perform operations including determining whether the second IP packet is a prioritized packet. In various embodiments, determining whether the IP packet is a prioritized packet may include performing operations to determine a parameter of the IP packet distinguishing a prioritized packet from a non-prioritized packet. In various embodiments, parameters of an IP packet that may distinguish a prioritized packet from a non-prioritized packet may include: an IPv4 five-tuple of the IP packet; an IPv6 five-tuple of the IP packet; a DSCP indication in a header of the IP packet; and/or a TOS indication in a header of the IP packet. For example, specific parameters and/or combinations of parameters may be associated with prioritized packets. The presence of those parameters may indicate that the IP packet is prioritized and the absence of those parameters may indicate that the IP packet is not prioritized. As a specific example, the DSCP decimal value 46 (i.e., binary value 101 110) indicated in the header of an IPv6 packet may indicate that the IP packet is a priority packet. The lack of a DSCP indicated in the header of an IPv6 packet or a DSCP decimal value of 0 (i.e., binary value 000 000) may indicate that the IP packet is not a priority packet. As another specific example, the TOS decimal value 5 (i.e., binary value 101) indicated in the header of an IPv4 packet may indicate that the IP packet is a priority packet. The lack of a TOS indicated in the header of an IPv4 packet or a TOS decimal value of 0 (i.e., binary value 000) may indicate that the IP packet is not a priority packet.

In response to determining that the IP packet is not a prioritized packet (i.e., determination block 704="No"), the processor may perform operations including sending the IP packet to a RAN using a default traffic handling configuration in block 706. For example, the IP packet may be sent using normal UL buffering in the UL path of the modem of the wireless device.

In response to determining that the IP packet is a prioritized packet (i.e., determination block 704="Yes"), the processor may perform operations including sending the IP packet to a RAN using a prioritized traffic handling configuration in block 708. In various embodiments, the prioritized traffic handling configuration may be configured to have a lower latency than a default traffic handling configuration used for sending non-prioritized IP packets. For example, the IP packet may be sent using no buffering in the UL path of the modem of the wireless device by triggering an interrupt for the modem to send the prioritized IP packet before other packets already present in a transmission queue.

Figure 8:
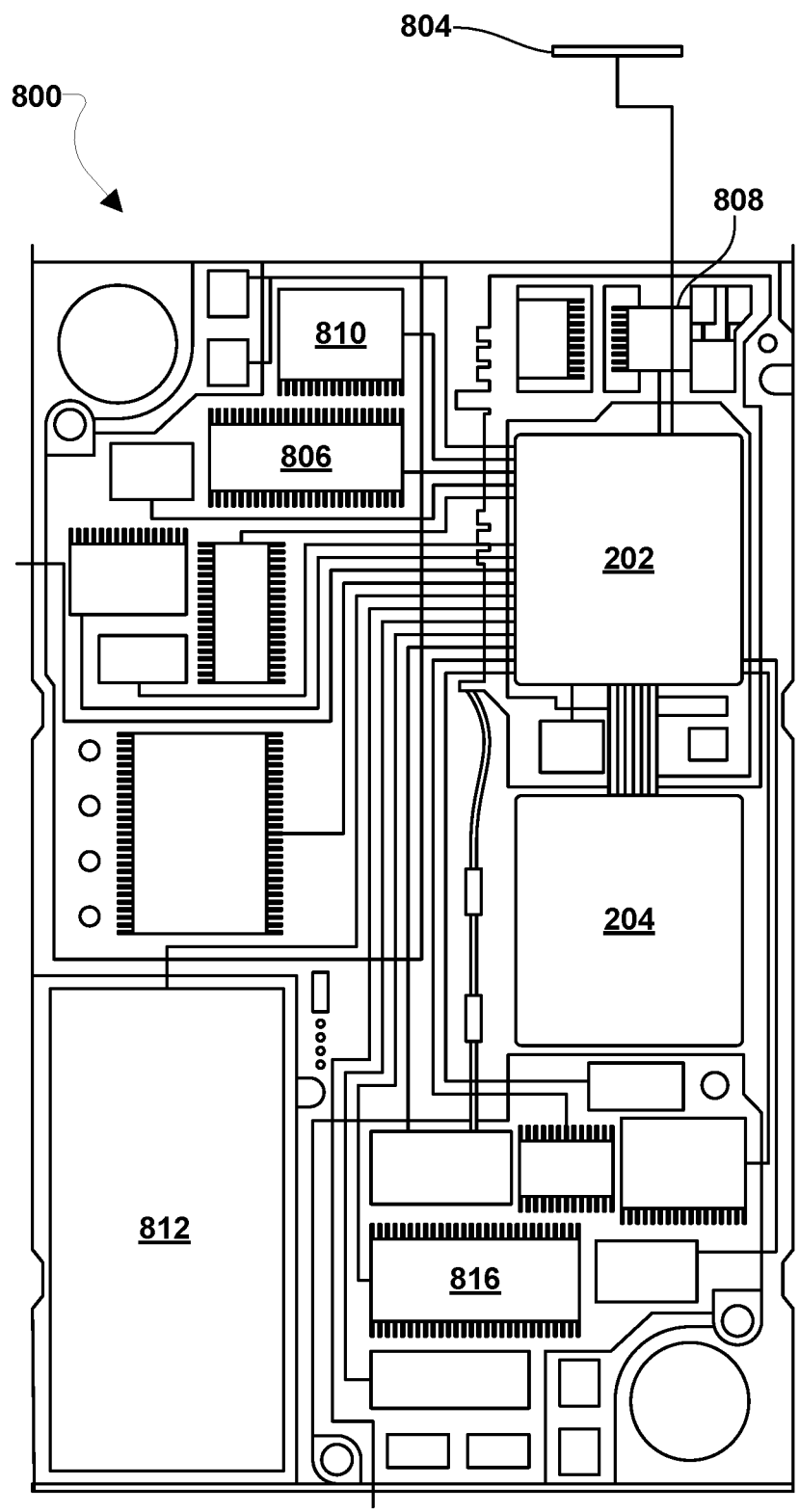
FIG. 8 is a component block diagram of an IoT device suitable for implementing various embodiments.

Various embodiments may be implemented on a variety of IoT devices, an example in the form of a circuit board for use in a device is illustrated in FIG. 8. With reference to FIGS. 1A-8, an IoT device 800 may include a first SOC 202 (e.g., a SOC-CPU) coupled to a second SOC 204 (e.g., a 5G capable SOC). The first and second SOCs 202, 204 may be coupled to internal memory 806. Additionally, the IoT device 800 may include or be coupled to an antenna 804 for sending and receiving wireless signals from a cellular telephone transceiver 808 or within the second SOC 204. The antenna 804 and transceiver 808 and/or second SOC 204 may support communications using various RATs, including NB-IoT, CIoT, GSM, BlueTooth, Wi-Fi, VoLTE, etc.

A IoT device 800 may also include a sound encoding/decoding (CODEC) circuit 810, which digitizes sound received from a microphone into data packets suitable for wireless transmission and decodes received sound data packets to generate analog signals that are provided to a speaker to generate sound in support of voice or VoLTE calls. Also, one or more of the processors in the first and second SOCs 202, 204, wireless transceiver 808 and CODEC 810 may include a digital signal processor (DSP) circuit (not shown separately).

Some IoT devices may include an internal power source, such as a battery 812 configured to power the SOCs and transceiver(s). Such IoT devices may include power management components 816 to manage charging of the battery 812.

Figure 9:
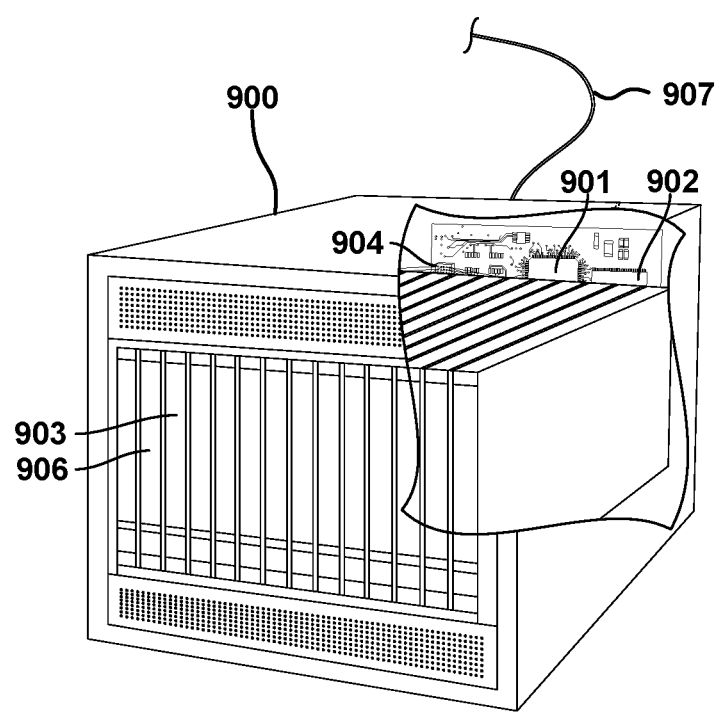
FIG. 9 is a component diagram of an example server suitable for implementing various embodiments.

Various embodiments (including, but not limited to, embodiments discussed above with reference to FIGS. 1A-7) may also be implemented on any of a variety of commercially available server devices, such as the server 900 illustrated in FIG. 9. With reference to FIGS. 1A-9, such a server 900 typically includes a processor 901 coupled to volatile memory 902 and a large capacity nonvolatile memory, such as a disk drive 903. The server 900 may also include a floppy disc drive, compact disc (CD) or digital versatile disc (DVD) drive 906 coupled to the processor 901. The server 900 may also include one or more network transceivers 904, such as a network access port, coupled to the processor 901 for establishing network interface connections with a communication network 907, such as a local area network coupled to other announcement system computers and servers, the Internet, the public switched telephone network, and/or a cellular network (e.g., CDMA, TDMA, GSM, PCS, 3G, 4G, 5G, LTE, or any other type of cellular network).

Figure 10:
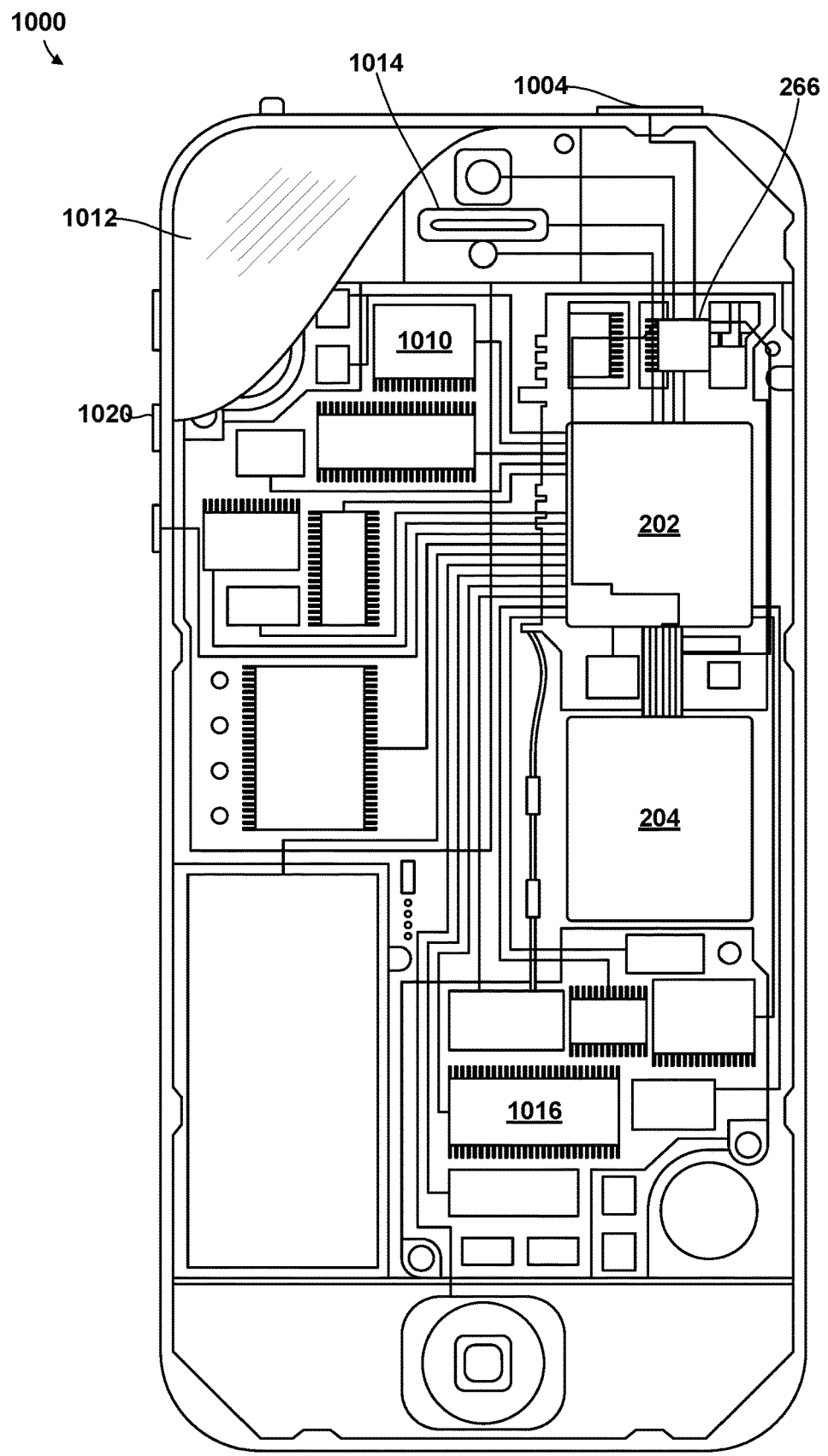
FIG. 10 is a component block diagram of a wireless device suitable for implementing various embodiments.

FIG. 10 is a component block diagram of a wireless device 1000 suitable for use with various embodiments. With reference to FIGS. 1A-10, various embodiments may be implemented on a variety of wireless device 1000 (e.g., the wireless device 120a-120g, 200, 203, 320, 402, 515), an example of which is illustrated in FIG. 10 in the form of a smartphone. The wireless device 1000 may include a first SOC 202 (e.g., a SOC-CPU) coupled to a second SOC 204 (e.g., a 5G capable SOC). The first and second SOCs 202, 204 may be coupled to internal memory, 1016, a display 1012, and to a speaker 1014. Additionally, the wireless device 1000 may include an antenna 1004 for sending and receiving electromagnetic radiation that may be connected to a wireless transceiver 266 coupled to one or more processors in the first and/or second SOCs 202, 204. The wireless device 1000 may also include menu selection buttons or rocker switches 1020 for receiving user inputs.

The wireless device 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1010 may include a digital signal processor (DSP) circuit (not shown separately).

The processors of the IoT device 800, server 900, and wireless device 1000 may be any programmable microprocessor, microcomputer or multiple processor chip or chips that can be configured by software instructions (applications) to perform a variety of functions, including the functions of Various embodiments described below. In some mobile devices, multiple processors may be provided, such as one processor within an SOC 204 dedicated to wireless communication functions and one processor within an SOC 202 dedicated to running other applications. Software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a processor of a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or Data structures stored thereon. Components may communicate by way of local and/or remote processes, function or procedure calls, electronic signals, Data packets, memory read/writes, and other known network, computer, processor, and/or process related communication methodologies.

A number of different cellular and mobile communication services and standards are available or contemplated in the future, all of which may implement and benefit from the various aspects. Such services and standards may include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), C-V2X, V2V, V2P, V2I, and V2N, etc. Each of these technologies involves, for example, the transmission and reception of voice, Data, signaling, and/or content Messages. It should be understood that any references to terminology and/or technical details related to an individual telecommunication standard or technology are for illustrative purposes only, and are not intended to limit the scope of the Claims to a particular communication system or technology unless specifically recited in the claim language.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the Claims.

The hardware used to implement various illustrative logics, logical blocks, modules, and circuits described in connection with the aspects disclosed herein may be implemented or performed with a general purpose processor, a digital Signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or Data structures and that may be accessed by a computer. Disk and disc, as used herein, includes compact disc (CD), laser disc, optical disc, digital versatile disc (DVD), floppy disk, and Blu-ray disc where disks usually reproduce Data magnetically, while discs reproduce Data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method for Internet Protocol (IP) packet handling performed by a first processor of a wireless device, comprising:

receiving an IP packet of a downlink (DL) data stream after layer 2 (L2) processing on the wireless device, wherein the DL data stream is provided to the wireless device via a connection to a radio access network (RAN) and the IP packet is at least in part decoded from a wireless transmission of the RAN via the L2 processing on the wireless device;

determining whether the IP packet is a prioritized packet after the L2 processing on the wireless device;

sending the IP packet to a second processor of the wireless device using a prioritized traffic handling configuration in response to determining that the IP packet is a prioritized packet, wherein the prioritized traffic handling configuration is configured to have a lower latency than a default traffic handling configuration used for sending non-prioritized IP packets from the first processor to a third processor of the wireless device and wherein the default traffic handling configuration applies a packet aggregation to non-prioritized IP packets after L2 processing and the prioritized traffic handling configuration sends the IP packet to the second processor without any aggregation;

receiving a second IP packet of an uplink (UL) data stream from the second processor of the wireless device;

determining whether the second IP packet is a prioritized packet; and sending the second IP packet to the RAN using an UL prioritized traffic handling configuration in response to determining that the second IP packet is a prioritized packet, wherein the UL prioritized traffic handling configuration is configured to have a lower latency than a default UL traffic handling configuration used for sending non-prioritized IP packets.

2. The method of claim 1, wherein:

the prioritized traffic handling configuration comprises using a first type hardware connection; and the default traffic handling configuration uses a second type hardware connection that is different than the first type hardware connection.

3. The method of claim 2, wherein the first type hardware connection is a peripheral component interconnect express (PCIe) connection and the second type hardware connection is a universal serial bus (USB).

4. The method of claim 1, wherein determining whether the IP packet is a prioritized packet after the L2 processing on the wireless device comprises:

determining a parameter of the IP packet after the L2 processing on the wireless device;

determining whether the parameter is associated with a prioritized packet setting;

determining that the IP packet is not a prioritized packet in response to determining that the parameter is not associated with a prioritized packet setting; and determining that the IP packet is a prioritized packet in response to determining that the parameter is associated with a prioritized packet setting.

5. The method of claim 4, wherein the parameter comprises a differentiated services code point (DSCP) indication or type-of-service (TOS) indication in a header of the IP packet.

6. The method of claim 4, wherein the parameter comprises one of an IP version 4 (IPv4) five-tuple of the IP packet, an IP version 6 (IPv6) five-tuple of the IP packet, an Evolved Packet Switched System (EPS) bearer identifier (ID) associated with the IP packet, a data radio bearer (DRB) ID associated with the IP packet, a packet data network (PDN) ID associated with the IP packet, a protocol data unit (PDU) session ID associated with the IP packet, an access point name (APN) associated with the IP packet, a data network name (DNN) associated with the IP packet, a service data adaptation protocol (SDAP) flow associated with the IP packet, a quality-of-service (QoS) class identifier (CQI) of a bearer associated with the IP packet, a Fifth Generation (5G) QoS Identifier (5QI) associated with the IP packet, a QoS Flow ID (QFI) associated with the IP packet, or a virtual local area network (VLAN) ID tag associated with the IP packet.

7. The method of claim 4, further comprising:

selecting the prioritized traffic handling configuration from a plurality of available prioritized traffic handling configurations in response to determining that the IP packet is a prioritized packet.

8. The method of claim 1, wherein the IP packet is an IP packet for a separate device wired or wirelessly connected to the wireless device.

9. The method of claim 1, wherein the second processor is a modem processor of the wireless device providing a wireless connection between the wireless device and a head-mounted device or a vehicle computing device.

10. A wireless device, comprising:

a first processor configured with processor-executable instructions to:

receive an Internet Protocol (IP) packet of a downlink (DL) data stream after layer 2 (L2) processing on the wireless device, wherein the DL data stream is a provided to the wireless device via a connection to a radio access network (RAN) and the IP packet is at least in part decoded from a wireless transmission of the RAN via the L2 processing on the wireless device;

determine whether the IP packet is a prioritized packet after the L2 processing on the wireless device;

send the IP packet to a second processor of the wireless device using a prioritized traffic handling configuration in response to determining that the IP packet is a prioritized packet, wherein the prioritized traffic handling configuration is configured to have a lower latency than a default traffic handling configuration used for sending non-prioritized IP packets from the first processor to a third processor of the wireless device and wherein the default traffic handling configuration applies a packet aggregation to non-prioritized IP packets after L2 processing and the prioritized traffic handling configuration sends the IP packet to the second processor without any aggregation;

receive a second IP packet of an uplink (UL) data stream from the second processor of the wireless device;

determine whether the second IP packet is a prioritized packet; and send the second IP packet to the RAN using an UL prioritized traffic handling configuration in response to determining that the second IP packet is a prioritized packet, wherein the UL prioritized traffic handling configuration is configured to have a lower latency than a default UL traffic handling configuration used for sending non-prioritized IP packets.

11. The wireless device of claim 10, wherein the first processor is further configured with processor-executable instructions such that:

the prioritized traffic handling configuration comprises using a first type hardware connection; and the default traffic handling configuration uses a second type hardware connection that is different than the first type hardware connection.

12. The wireless device of claim 11, wherein the first type hardware connection is a peripheral component interconnect express (PCIe) connection and the second type hardware connection is a universal serial bus (USB).

13. The wireless device of claim 10, wherein the first processor is further configured with processor-executable instructions to determine whether the IP packet is a prioritized packet after the L2 processing on the wireless device by:
 determining a parameter of the IP packet after the L2 processing on the wireless device;
 determining whether the parameter is associated with a prioritized packet setting;
 determining that the IP packet is not a prioritized packet in response to determining that the parameter is not associated with a prioritized packet setting; and
 determining that the IP packet is a prioritized packet in response to determining that the parameter is associated with a prioritized packet setting.

14. The wireless device of claim 13, wherein the parameter comprises a differentiated services code point (DSCP) indication or type-of-service (TOS) indication in a header of the IP packet.

15. The wireless device of claim 13, wherein the parameter comprises one of an IP version 4 (IPv4) five-tuple of the IP packet, an IP version 6 (IPv6) five-tuple of the IP packet, an Evolved Packet Switched System (EPS) bearer identifier (ID) associated with the IP packet, a data radio bearer (DRB) ID associated with the IP packet, a packet data network (PDN) ID associated with the IP packet, a protocol data unit (PDU) session ID associated with the IP packet, an access point name (APN) associated with the IP packet, a data network name (DNN) associated with the IP packet, a service data adaptation protocol (SDAP) flow associated with the IP packet, a quality-of-service (QoS) class identifier (CQI) of a bearer associated with the IP packet, a Fifth Generation (5G) QoS Identifier (5QI) associated with the IP packet, a QoS Flow ID (QFI) associated with the IP packet, or a virtual local area network (VLAN) ID tag associated with the IP packet.

16. The wireless device of claim 13, wherein the first processor is further configured with processor-executable instructions to:
 select the prioritized traffic handling configuration from a plurality of available prioritized traffic handling configurations in response to determining that the IP packet is a prioritized packet.

17. A non-transitory processor readable medium having stored thereon processor-executable instructions configured to cause a first processor of a wireless device to perform operations comprising:
 receiving an Internet Protocol (IP) packet of a downlink (DL) data stream after layer 2 (L2) processing on the wireless device, wherein the DL data stream is a provided to the wireless device via a connection to a radio access network (RAN) and the IP packet is at least in part decoded from a wireless transmission of the RAN via the L2 processing on the wireless device;
 determining whether the IP packet is a prioritized packet after the L2 processing on the wireless device;
 sending the IP packet to a second processor of the wireless device using a prioritized traffic handling configuration in response to determining that the IP packet is a prioritized packet, wherein the prioritized traffic handling configuration is configured to have a lower latency than a default traffic handling configuration used for sending non-prioritized IP packets from the first processor to a third processor of the wireless device and wherein the default traffic handling configuration applies a packet aggregation to non-prioritized IP packets after L2 processing and the prioritized traffic handling configuration sends the IP packet to the second processor without any aggregation;
 receiving a second IP packet of an uplink (UL) data stream from the second processor of the wireless device;
 determining whether the second IP packet is a prioritized packet; and
 sending the second IP packet to the RAN using an UL prioritized traffic handling configuration in response to determining that the second IP packet is a prioritized packet, wherein the UL prioritized traffic handling configuration is configured to have a lower latency than a default UL traffic handling configuration used for sending non-prioritized IP packets.

18. The non-transitory processor readable medium of claim 17, wherein the stored processor-executable instructions are configured to cause the first processor of the wireless device to perform operations such that:
 the prioritized traffic handling configuration comprises using a first type hardware connection; and
 the default traffic handling configuration uses a second type hardware connection that is different than the first type hardware connection.

19. The non-transitory processor readable medium of claim 18, wherein the stored processor-executable instructions are configured to cause the first processor of the wireless device to perform operations such that the first type hardware connection is a peripheral component interconnect express (PCIe) connection and the second type hardware connection is a universal serial bus (USB).

20. The non-transitory processor readable medium of claim 17, wherein the stored processor-executable instructions are configured to cause the first processor of the wireless device to perform operations such that determining whether the IP packet is a prioritized packet after the L2 processing on the wireless device comprises:
 determining a parameter of the IP packet after the L2 processing on the wireless device;
 determining whether the parameter is associated with a prioritized packet setting;
 determining that the IP packet is not a prioritized packet in response to determining that the parameter is not associated with a prioritized packet setting; and
 determining that the IP packet is a prioritized packet in response to determining that the parameter is associated with a prioritized packet setting.

21. The non-transitory processor readable medium of claim 20, wherein the stored processor-executable instructions are configured to cause the first processor of the wireless device to perform operations such that the parameter comprises a differentiated services code point (DSCP) indication or type-of-service (TOS) indication in a header of the IP packet.

22. The non-transitory processor readable medium of claim 20, wherein the stored processor-executable instructions are configured to cause the first processor of the wireless device to perform operations further comprising:
 selecting the prioritized traffic handling configuration from a plurality of available prioritized traffic handling configurations in response to determining that the IP packet is a prioritized packet.

23. A wireless device, comprising:
means for receiving an Internet Protocol (IP) packet of a downlink (DL) data stream after layer 2 (L2) processing on the wireless device by a first processor, wherein the DL data stream is a provided to the wireless device via a connection to a radio access network (RAN) and the IP packet is at least in part decoded from a wireless transmission of the RAN via the L2 processing on the wireless device;
means for determining whether the IP packet is a prioritized packet after the L2 processing on the wireless device;
means for sending the IP packet to a second processor of the wireless device using a prioritized traffic handling configuration in response to determining that the IP packet is a prioritized packet, wherein the prioritized traffic handling configuration is configured to have a lower latency than a default traffic handling configuration used for sending non-prioritized IP packets from the first processor to a third processor of the wireless device and wherein the default traffic handling configuration applies a packet aggregation to non-prioritized IP packets after L2 processing and the prioritized traffic handling configuration sends the IP packet to the second processor without any aggregation;
means for receiving a second IP packet of an uplink (UL) data stream from the second processor of the wireless device;
means for determining whether the second IP packet is a prioritized packet; and
means for sending the second IP packet to the RAN using an UL prioritized traffic handling configuration in response to determining that the second IP packet is a prioritized packet, wherein the UL prioritized traffic handling configuration is configured to have a lower latency than a default UL traffic handling configuration used for sending non-prioritized IP packets.

* * * * *